United States Patent
Zheng et al.

(10) Patent No.: US 11,652,818 B2
(45) Date of Patent: May 16, 2023

(54) METHOD AND APPARATUS FOR ACCESSING SERVICE SYSTEM

(71) Applicant: ADVANCED NEW TECHNOLOGIES CO., LTD., Grand Cayman (KY)

(72) Inventors: Hongdong Zheng, Hangzhou (CN); Long Chen, Hangzhou (CN); Hanxiao Xiao, Hangzhou (CN); Zixi Liu, Hangzhou (CN); Biao Zhang, Hangzhou (CN); Zihao Zeng, Hangzhou (CN); Yujiang Liu, Hangzhou (CN); Xing Yao, Hangzhou (CN); Fengxiang Ding, Hangzhou (CN); Yuanchao Zhang, Hangzhou (CN); Lu Jin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 232 days.

(21) Appl. No.: 16/875,619

(22) Filed: May 15, 2020

(65) Prior Publication Data
US 2020/0280561 A1 Sep. 3, 2020

Related U.S. Application Data

(63) Continuation of application No. PCT/CN2020/071746, filed on Jan. 13, 2020.

(30) Foreign Application Priority Data

Jul. 18, 2019 (CN) .......................... 201910651031.6

(51) Int. Cl.
*H04L 29/06* (2006.01)
*H04L 9/40* (2022.01)

(52) U.S. Cl.
CPC ...... *H04L 63/0869* (2013.01); *H04L 63/0861* (2013.01); *H04L 63/0876* (2013.01); *H04L 63/10* (2013.01); *H04L 63/1433* (2013.01)

(58) Field of Classification Search
CPC ............. H04L 63/0869; H04L 63/1433; H04L 63/0861; H04L 63/10; H04L 63/0876
(Continued)

(56) References Cited

U.S. PATENT DOCUMENTS 7,370,356 B1 5/2008 Guo
10,091,195 B2 10/2018 Lindemann
(Continued)

FOREIGN PATENT DOCUMENTS

CN 104301316 A 1/2015
CN 105100009 A 11/2015
(Continued)

OTHER PUBLICATIONS

Supplemental Search dated Jul. 29, 2020, issued in related Chinese Application No. 201910651031.6 (1 page).
(Continued)

*Primary Examiner* — Jeffrey C Pwu
*Assistant Examiner* — Nega Woldemariam

(57) ABSTRACT

A method for accessing a service system includes: receiving fingerprint information of a to-be-verified terminal device and identification information of a to-be-verified user from a login computer system based on a service access instruction to access the service server; verifying, according to the fingerprint information of the to-be-verified terminal device and the identification information of the to-be-verified user, whether the to-be-verified terminal device is a specified device of the to-be-verified user based on a specified device database, the specified device database comprising identification information of each user and fingerprint information
(Continued)

of a specified device of each user; determining, according to a result of the verifying, whether to allow the login computer system to access the service server according to the service access instruction; and if yes, sending a notification to the login computer system to enable the login computer system to access the service server.

12 Claims, 5 Drawing Sheets

(58) Field of Classification Search
 USPC .......................................................... 726/5
 See application file for complete search history.

(56) References Cited

U.S. PATENT DOCUMENTS

| | | |
|---|---|---|
| 2005/0289649 A1 | 12/2005 | Mitomo et al. |
| 2010/0107225 A1 | 4/2010 | Spencer et al. |
| 2014/0123255 A1 | 5/2014 | Etchegoyen |
| 2015/0026330 A1 | 1/2015 | Ahmed et al. |
| 2015/0237039 A1 | 8/2015 | Grajek et al. |
| 2016/0125490 A1 | 5/2016 | Angal et al. |
| 2016/0127445 A1 | 5/2016 | Shen et al. |
| 2016/0155128 A1 | 6/2016 | Desai et al. |
| 2016/0380900 A1 | 12/2016 | Kolhi et al. |
| 2017/0289134 A1* | 10/2017 | Bradley ................ H04L 63/105 |
| 2018/0039990 A1 | 2/2018 | Lindemann |
| 2018/0083963 A1 | 3/2018 | Devdas et al. |
| 2018/0270229 A1 | 9/2018 | Zhang et al. |
| 2018/0295148 A1* | 10/2018 | Mayorgo ................ H04W 4/70 |
| 2019/0164156 A1 | 5/2019 | Lindemann |

FOREIGN PATENT DOCUMENTS

| | | |
|---|---|---|
| CN | 106656958 A | 5/2017 |
| CN | 107786489 A | 3/2018 |
| CN | 107888592 A | 4/2018 |
| CN | 108183924 A | 6/2018 |
| CN | 108322427 A | 7/2018 |
| CN | 108924154 A | 11/2018 |
| CN | 109040056 A | 12/2018 |
| CN | 109214632 A | 1/2019 |
| CN | 109302394 A | 2/2019 |
| CN | 109639740 A | 4/2019 |
| CN | 110445769 A | 11/2019 |
| TW | I356349 B | 1/2012 |
| WO | 2019104323 A1 | 5/2019 |

OTHER PUBLICATIONS

First Search for Chinese Application No. 201910651031.6 dated May 12, 2020.
First Office Action for Chinese Application No. 201910651031.6 dated May 21, 2020.
Second Office Action for Chinese Application No. 201910651031.6 dated Jul. 2, 2020.
Written Opinion and International Search Report for PCT Application No. PCT/CN2020/071746 dated Apr. 17, 2020.
Search Report for Taiwanese Application No. 109105145 dated Nov. 11, 2020.

* cited by examiner

METHOD AND APPARATUS FOR ACCESSING SERVICE SYSTEM

CROSS-REFERENCE TO RELATED APPLICATIONS

This application is a continuation application of International Patent Application No. PCT/CN2020/071746, filed on Jan. 13, 2020, which claims priority to and benefits of the Chinese Patent Application No. 201910651031.6, filed on Jul. 18, 2019. The contents of the above-referenced applications are incorporated herein by reference in their entirety.

TECHNICAL FIELD

This application relates to the field of computer technologies, and in particular, to a service system access method, apparatus, and device, and a storage medium.

BACKGROUND

With rapid development of science and technology, to facilitate daily life and daily office work of users, a service system with various functions has been developed, for the users to log in to the service system to handle related life or office affairs.

When a user logs in to a service system by using a terminal device and handles related affairs in the service system, there may be a case of data leakage due to an attack by an attacker. Currently, commonly used defense methods include network boundary defense and account password-based security protection. However, when an account of the user is lost or phished, the attacker launches an attack on the service system according to the account of the user. In this case, the commonly used methods cannot defend against the attack, resulting in incapability to effectively defend against a network attack.

SUMMARY

An objective of one or more embodiments of this specification is to provide a service system access method, apparatus, and device, and a storage medium, to resolve a problem in the existing technologies that network attacks cannot be effectively defended against.

According to one aspect, the one or more embodiments of this specification provide a method for accessing a service server including: receiving fingerprint information of a to-be-verified terminal device and identification information of a to-be-verified user from a login computer system based on a service access instruction to access the service server, wherein the service access instruction is initiated by the to-be-verified user using the to-be-verified terminal device; verifying, according to the fingerprint information of the to-be-verified terminal device and the identification information of the to-be-verified user, whether the to-be-verified terminal device is a specified device of the to-be-verified user based on a specified device database, wherein the specified device database comprises identification information of each user and fingerprint information of a specified device of each user; determining, according to a result of the verifying, whether to allow the login computer system to access the service server according to the service access instruction; and in response to determining that the login computer system is allowed to access the service server, sending a notification to the login computer system to enable the login computer system to access the service server.

In some embodiments, the method further includes: receiving security information related to the to-be-verified terminal device from the login serve; the determining, according to the verified result, whether to allow the login computer system to access the service server according to the service access instruction comprises: performing, if the to-be-verified terminal device is a specified device of the to-be-verified user, security risk verification on the to-be-verified terminal device according to the security information related to the to-be-verified terminal device; and determining, according to the performed security risk verification, whether to allow the login computer system to access the service server according to the service access instruction.

In some embodiments, the service access instruction sent to login computer system to access the service server is initiated by the to-be-verified user using the to-be-verified terminal device; and the determining, according to a result of the verifying, whether to allow the login computer system to access the service server according to the service access instruction comprises: sending, if the to-be-verified terminal device is a specified device of the to-be-verified user, a verification success notification to the login computer system, to enable the login computer system to access the service server according to the service access instruction; or sending, if the to-be-verified terminal device is not a specified device of the to-be-verified user, a verification failure notification to the login computer system, to perform authentication on the to-be-verified user; and determine, according to the performed authentication on the to-be-verified user, whether to access the service server according to the service access instruction.

In some embodiments, the verifying, according to the fingerprint information of the to-be-verified terminal device and the identification information of the to-be-verified user, whether the to-be-verified terminal device is a specified device of the to-be-verified user based on a specified device database further comprises: sending the fingerprint information of the to-be-verified terminal device and the identification information of the to-be-verified user to a risk calculation engine, to verify whether the to-be-verified terminal device is a specified device of the to-be-verified user.

In some embodiments, the service access instruction sent to the service server to access the service server is initiated by the to-be-verified user using the to-be-verified terminal device; and the method further comprises: forwarding, when verifying that the service access instruction does not comprise a trusted identifier or comprises an invalid identifier, the service access instruction by an access management server to the login computer system.

In some embodiments, the determining, according to a result of verifying, whether to allow the login computer system to access the according to the service access instruction comprises: sending, if the to-be-verified terminal device is a specified device of the to-be-verified user, a verification success notification to the login computer system, to enable the login computer system to generate a trusted identifier corresponding to the to-be-verified terminal device and the to-be-verified user, wherein the access management server is configured to access the service server according to the service access instruction with the generated trusted identifier.

In some embodiments, the determining, according to a result of verifying, whether to allow the login computer system to access the service server according to the service access instruction comprises: sending, if the to-be-verified terminal device is not a specified device of the to-be-verified user, a verification failure notification to the login computer system, to perform authentication on the to-be-verified user; and determine, according to the performed authentication on the to-be-verified user, whether to generate a trusted identifier corresponding to the to-be-verified terminal device and the to-be-verified user.

According to another aspect, the one or more embodiments of this specification provide a device for accessing service server, including: a processor; and a memory, configured to store computer executable instructions executable by the processor, cause the processor to perform operations including: receiving fingerprint information of a to-be-verified terminal device and identification information of a to-be-verified user from a login computer system based on a service access instruction to access the service server, wherein the service access instruction is initiated by the to-be-verified user using the to-be-verified terminal device; verifying, according to the fingerprint information of the to-be-verified terminal device and the identification information of the to-be-verified user, whether the to-be-verified terminal device is a specified device of the to-be-verified user based on a specified device database, wherein the specified device database comprises identification information of each user and fingerprint information of a specified device of each user; determining, according to a result of the verifying, whether to allow the login computer system to access the service server according to the service access instruction; and in response to determining that the login computer system is allowed to access the service server, sending a notification to the login computer system to enable the login computer system to access the service server.

According to still another aspect, the one or more embodiments of this specification provide a non-transitory computer-readable storage medium configured with instructions executable by one or more processors to cause the one or more processors to perform operations including: receiving fingerprint information of a to-be-verified terminal device and identification information of a to-be-verified user from a login computer system based on a service access instruction to access the service server, wherein the service access instruction is initiated by the to-be-verified user using the to-be-verified terminal device; verifying, according to the fingerprint information of the to-be-verified terminal device and the identification information of the to-be-verified user, whether the to-be-verified terminal device is a specified device of the to-be-verified user based on a specified device database, wherein the specified device database comprises identification information of each user and fingerprint information of a specified device of each user; determining, according to a result of the verifying, whether to allow the login computer system to access the service server according to the service access instruction; and in response to determining that the login computer system is allowed to access the service server, sending a notification to the login computer system to enable the login computer system to access the service server.

In a technical solution of the one or more embodiments of this specification, the risk calculation engine system verifies whether the to-be-verified terminal device is a specified device of the to-be-verified user based on a specified device database, wherein the specified device database comprises identification information of each user and fingerprint information of a specified device of each user; determining, according to a result of the verifying, whether to allow the login computer system to access the service server according to the service access instruction. Therefore, a network attack caused by loss or phishing of an account of the to-be-verified user can be intercepted, thereby effectively defending against the network attack. In addition, the verification step is simple and easy to perform, and therefore, verification efficiency is relatively high.

In another technical solution of the one or more embodiments of this specification, the login computer system sending the fingerprint information of the to-be-verified terminal device and the identification information of the to-be-verified user to a risk calculation engine, to verify whether the to-be-verified terminal device is a specified device of the to-be-verified user, whether to access the service system according to the service access instruction, that is, needs to determine, according to a result of verifying indicating whether the to-be-verified terminal device is a specified device of the to-be-verified user, whether to access the service system. Therefore, a network attack caused by loss or phishing of an account of the to-be-verified user can be intercepted, thereby effectively defending against the network attack.

BRIEF DESCRIPTION OF THE DRAWINGS

To describe the technical solutions in one or more embodiments of the specification or in the existing technology more clearly, the following briefly introduces the accompanying drawings required for describing the embodiments or the existing technology. Apparently, the accompanying drawings in the following description show merely some embodiments in one or more embodiments of the present application, and a person of ordinary skill in the art may still derive other drawings from these accompanying drawings without creative efforts.

DETAILED DESCRIPTION OF THE EMBODIMENTS

One or more embodiments of the specification provide a method, apparatus, and device, and a storage medium for accessing a service system to resolve the problem in the existing technology that defense against a network attack cannot be effectively performed.

For a better understanding of the technical solutions in one or more embodiments of the specification by those skilled in the art, the technical solutions in the one or more embodiments of the specification will be clearly and completely described below with reference to the accompanying drawings in the one or more embodiments of the specification. Obviously, the described embodiments are some rather than all of the embodiments of the specification. All other embodiments obtained by a person of ordinary skill in the art based on one or more embodiments of the specification without creative efforts shall fall within the protection scope of one or more embodiments of the specification.

Figure 1:
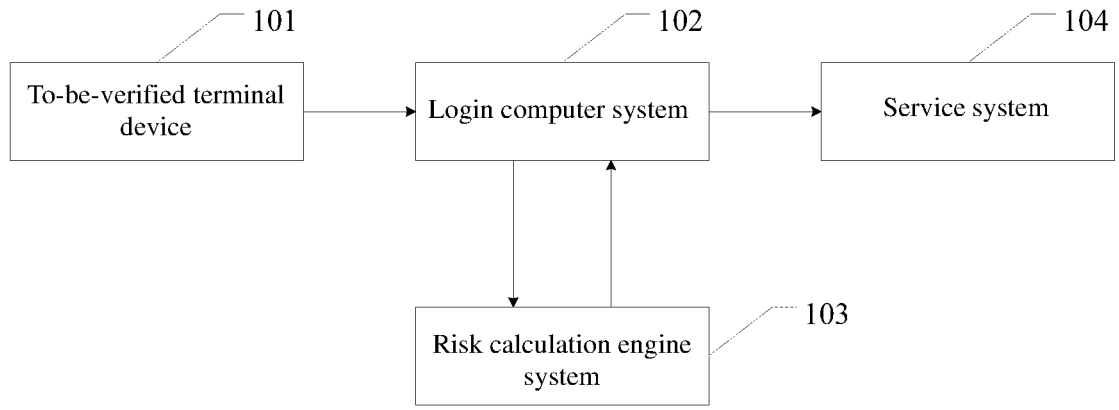
FIG. 1 is a schematic diagram of an application scenario for accessing a service system, according to an embodiment of the present application.

FIG. 1 is a schematic diagram of an application scenario for accessing a service system, according to an embodiment of the specification. As shown in FIG. 1, the application scenario includes a to-be-verified terminal device 101, a login computer system 102, a risk calculation engine system 103, and a service server/system 104. The following describes a procedure for accessing a service system according to the application scenario for accessing a service system. A to-be-verified user may initiate an instruction to the login computer system using the to-be-verified terminal device 101 on accessing the service system 104. For ease of subsequent description, the instruction is named herein as a service access instruction.

The login computer system 102 receives the service access instruction, and obtains fingerprint information of the to-be-verified terminal device and identification information of the to-be-verified user based on the instruction. The login computer system 102 sends the fingerprint information of the to-be-verified terminal device and the identification information of the to-be-verified user to the risk calculation engine system 103. The risk calculation engine system 103 verifies whether the to-be-verified terminal device 101 is a specified device of the to-be-verified user according to the fingerprint information of the to-be-verified terminal device 101 and the identification information of the to-be-verified user, and sends a result of the verifying to the login computer system 102. The login computer system 102 is configured to receive the result of the verifying. If the result of the verifying indicates that the to-be-verified terminal device 101 is a specified device of the to-be-verified user, the login computer system 102 accesses the service system 104 according to the service access instruction. If the result of the verifying indicates that the to-be-verified terminal device 101 is not a specified device of the to-be-verified user, the login computer system 102 performs authentication on the to-be-verified user, and accesses the service system 104 according to the instruction if the authentication succeeds, or prohibits access to the service system 104 if the authentication fails.

Figure 2:
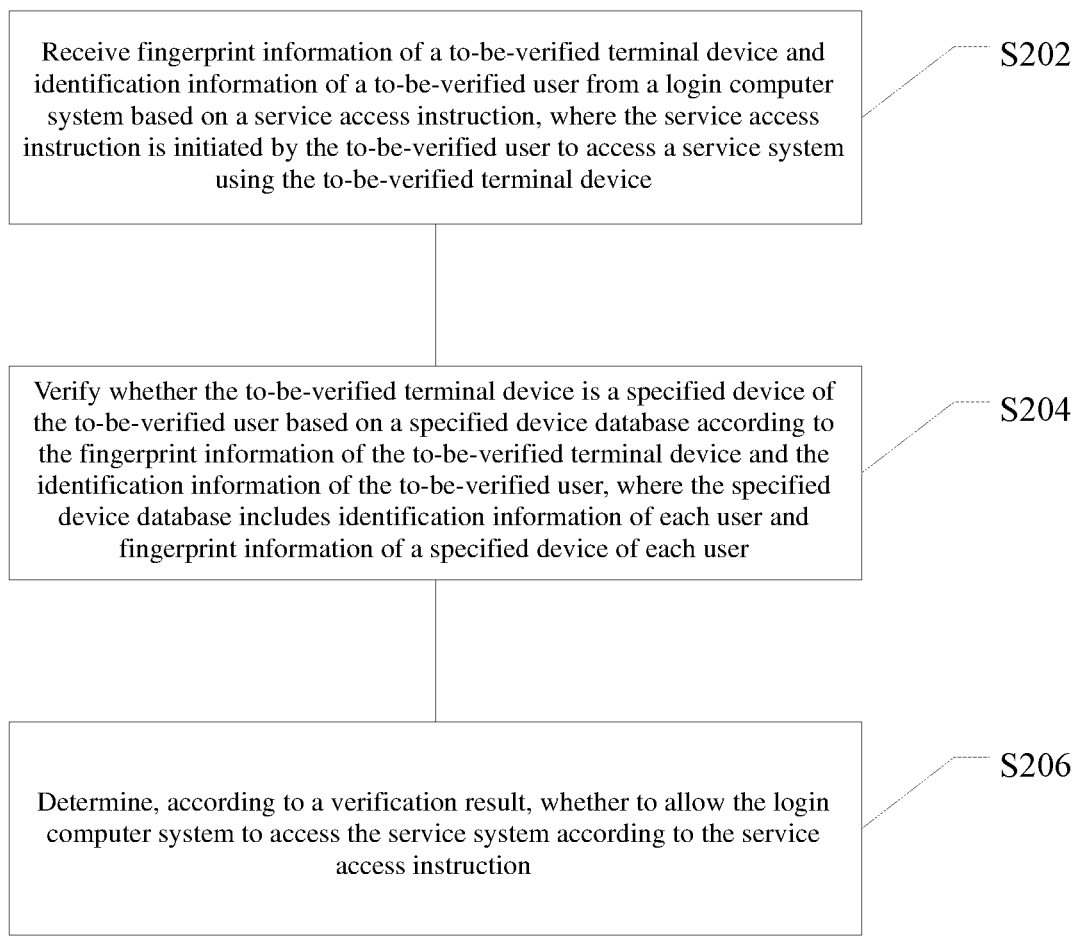
FIG. 2 is a flowchart of a method for accessing a service system, according to an embodiment of the specification.

Based on the application scenario for accessing a service system shown in FIG. 1, an embodiment of the specification provides a method for accessing a service system. The risk calculation engine system 103 may be, for example, an independent server, or may be a server cluster including a plurality of servers, which is not specially limited in this exemplary embodiment. The service system may be, for example, an independent service server, or may be a server cluster including a plurality of servers, which is not specially limited in this exemplary embodiment. FIG. 2 is a flowchart of a method for accessing a service system, according to an embodiment of the specification, including the following steps.

At Step S202, the method may include receiving fingerprint information of a to-be-verified terminal device and identification information of a to-be-verified user from a login computer system based on a service access instruction, where the service access instruction sent to access the service system is initiated by the to-be-verified user using the to-be-verified terminal device. Specifically, the service access instruction sent to the login computer system to access the service system is initiated by the to-be-verified user using the to-be-verified terminal device.

In this embodiment of the specification, if the to-be-verified user intends to initiate an instruction to the login computer system to access the service system using the to-be-verified terminal device, the to-be-verified user may initiate the instruction to the login computer system to access the service system using application software (for example, a browser) in the to-be-verified terminal device. Specifically, after receiving address information of the service system that is entered by the to-be-verified user, the application software obtains the identification information of the to-be-verified user and data of the to-be-verified terminal device, generates a service access instruction according to the identification information of the to-be-verified user, the data of the to-be-verified terminal device, and the address information of the service system, and initiates the instruction to the login computer system to access the service system using the service access instruction.

The data of the to-be-verified terminal device may include at least an identifier, a model, a brand, and the like of the to-be-verified terminal device, which is not specially limited in this exemplary embodiment. The identification information of the to-be-verified user may be, for example, an ID card number or a mobile phone number of the to-be-verified user, or an account name of the to-be-verified user for accessing the service system, which is not specially limited in this exemplary embodiment. The address information of the service system may be website information of any page in the service system, or the like. The to-be-verified terminal device may be, for example, a smartphone, a personal computer, or a tablet computer, which is not specially limited in this exemplary embodiment.

The login computer system receives the service access instruction, and parses the service access instruction, to obtain the data of the to-be-verified terminal device and the identification information of the to-be-verified user; then, generates the fingerprint information corresponding to the to-be-verified terminal device according to the data of the to-be-verified terminal device, where a specific generation process is to be described below and details are not described herein; and sends the fingerprint information of the to-be-verified terminal device and the identification information of the to-be-verified user to a risk calculation engine system. The risk calculation engine system receives the fingerprint information of the to-be-verified terminal device and the identification information of the to-be-verified user.

At Step S204, the method may include verifying whether the to-be-verified terminal device is a specified device of the to-be-verified user based on a specified device database according to the fingerprint information of the to-be-verified terminal device and the identification information of the to-be-verified user, where the specified device database includes identification information of each user and fingerprint information of a specified device of each user.

In this embodiment of the specification, the fingerprint information of the specified device of each user and the corresponding identification information of each user may be associated with each other in advance and stored in the specified device database. Specifically, the fingerprint information corresponding to the specified device of the user may be calculated according to data of the specified device of the user. It should be noted that, each user may have one or more specified devices, which is not specially limited in this embodiment of the specification. The fingerprint information of the specified device and the fingerprint information of the to-be-verified terminal device are generated according to a same principle.

A process of verifying whether the to-be-verified terminal device is a specified device of the to-be-verified user based on a specified device database may include: comparing the identification information of the to-be-verified user with the identification information of each user in the specified device database, determining a user whose identification information successfully matches the identification information of the to-be-verified user on the specified device database as a target user, matching fingerprint information of a specified device of the target user with the fingerprint information of the to-be-verified terminal device, and if the matching succeeds, determining that the to-be-verified terminal device is a specified device of the to-be-verified user, or if the matching fails, determining that the to-be-verified terminal device is not a specified device of the to-be-verified user. It should be noted that, when the target user has a plurality of specified devices, if the fingerprint information of the to-be-verified terminal device successfully matches one of the plurality of specified devices of the target user, the matching is determined to be succeeded, or if the fingerprint information of the to-be-verified terminal device does not match fingerprint information of any one of the plurality of specified devices of the target user, the matching is determined to be failed.

At Step S206, the method may include determining, according to a result of the verifying, whether to allow the login computer system to access the service system according to the service access instruction.

In this embodiment of the specification, if the to-be-verified terminal device is a specified device of the to-be-verified user, a verification success notification is sent to the login computer system, for the login computer system to access the service system according to the service access instruction in response to the verification success notification. That is, the login computer system may access the service system according to the address information of the service system in the service access instruction.

If the to-be-verified terminal device is not a specified device of the to-be-verified user, a verification failure notification is sent to the login computer system, for the login computer system to perform authentication on the to-be-verified user in response to the verification failure notification and determine, according to the performed authentication on the to-be-verified user, whether to access the service system according to the service access instruction. It should be noted that, a process of performing authentication on the to-be-verified user is to be described below, and therefore, details are not described herein.

The risk calculation engine system verifies whether the to-be-verified terminal device is a specified device of the to-be-verified user based on the specified device database according to the fingerprint information of the to-be-verified terminal device and the identification information of the to-be-verified user; determines, according to the result of the verifying, whether to allow the login computer system to access the service system according to the service access instruction, that is, during access to the service system, verifies whether the to-be-verified terminal device used by the to-be-verified user to initiate the service access instruction is a specified device of the to-be-verified user; and determines, according to the result of the verifying, whether to perform access. In this way, a network attack caused by loss or phishing of an account of the to-be-verified user can be intercepted, thereby effectively defending against the network attack. In addition, the verification step is simple and easy to perform, and therefore, verification efficiency is relatively high.

To ensure security of the to-be-verified terminal device and avoid attacks on the service system caused by vulnerabilities in the to-be-verified terminal device, virus Trojans, and the like, the method may further include: receiving security information related to the to-be-verified terminal device from the login computer system.

In this embodiment of the specification, the security information related to the to-be-verified terminal device may include security information of the to-be-verified terminal device, personnel data of the to-be-verified user, or the like obtained by security software (for example, antivirus software or EDR software) installed in the to-be-verified terminal device, which is not specially limited in this exemplary embodiment. The personnel data of the to-be-verified user may include identity information of the to-be-verified user, information about a company to which the to-be-verified user belongs, business trip information of the to-be-verified user, and the like.

The security software in the to-be-verified terminal device regularly performs security detection on the to-be-verified terminal device, and reports security information obtained through the security detection to a security information database. The personnel data of the to-be-verified user is stored in a personnel database. Based on this, the login computer system may receive, from the security information database, the security information of the to-be-verified terminal device from the security software installed in the to-be-verified terminal device, and receive the personnel data of the to-be-verified user from the personnel database, to obtain the security information related to the to-be-verified terminal device, and send the security information related to the to-be-verified terminal device to the risk calculation engine system. It should be noted that, the manner of obtaining the security information related to the to-be-verified terminal device is merely exemplary, and is not intended to limit the specification.

The determining, according to a result of the verifying, whether to allow the login computer system to access the service system according to the service access instruction may include: if the to-be-verified terminal device is a specified device of the to-be-verified user, performing security risk verification on the to-be-verified terminal device according to the security information related to the to-be-verified terminal device; and determining, according to the performed security risk verification, whether to allow the login computer system to access the service system according to the service access instruction.

In this embodiment of the specification, a process of performing security risk verification on the to-be-verified terminal device according to the security information related to the to-be-verified terminal device may include: inputting the security information related to the to-be-verified terminal device into a risk calculation rule database, where the risk calculation rule database may include a plurality of security assessment rules; inputting the security information related to the to-be-verified terminal device into each security assessment rule, for the security assessment rule to output an assessment result; and determining whether the to-be-verified terminal device has a security risk according to the assessment result output by each security assessment rule. It should be noted that, the process of performing security risk verification on the to-be-verified terminal device is merely exemplary, and is not intended to limit the specification.

If the result of security risk verification indicates that the to-be-verified terminal device has no security risk, a verification success notification is sent to the login computer system, for the login computer system to access the service system according to the service access instruction in response to the verification success notification. That is, the login computer system may access the service system according to the address information of the service system in the service access instruction. If the result of security risk verification indicates that the to-be-verified terminal device has a security risk, a verification failure notification is sent to the login computer system, for the login computer system to prohibit access to the service system according to the verification failure notification.

It can be learned from the above that, a security risk of the to-be-verified terminal device is verified after it is determined that the to-be-verified terminal device is a specified device of the to-be-verified user, and the service system is accessed when the to-be-verified terminal device has no security risk, that is, the service system is accessed when it is ensured that the to-be-verified terminal device to which the to-be-verified user initiates the service access instruction is a specified device of the to-be-verified user and the specified device has no security risk. In this way, a network attack caused by loss or phishing of an account of the to-be-verified user can be intercepted, and a network attack caused by vulnerabilities in the to-be-verified terminal device, virus Trojans, and the like can also be intercepted, thereby more effectively defending against the network attacks.

Figure 3:
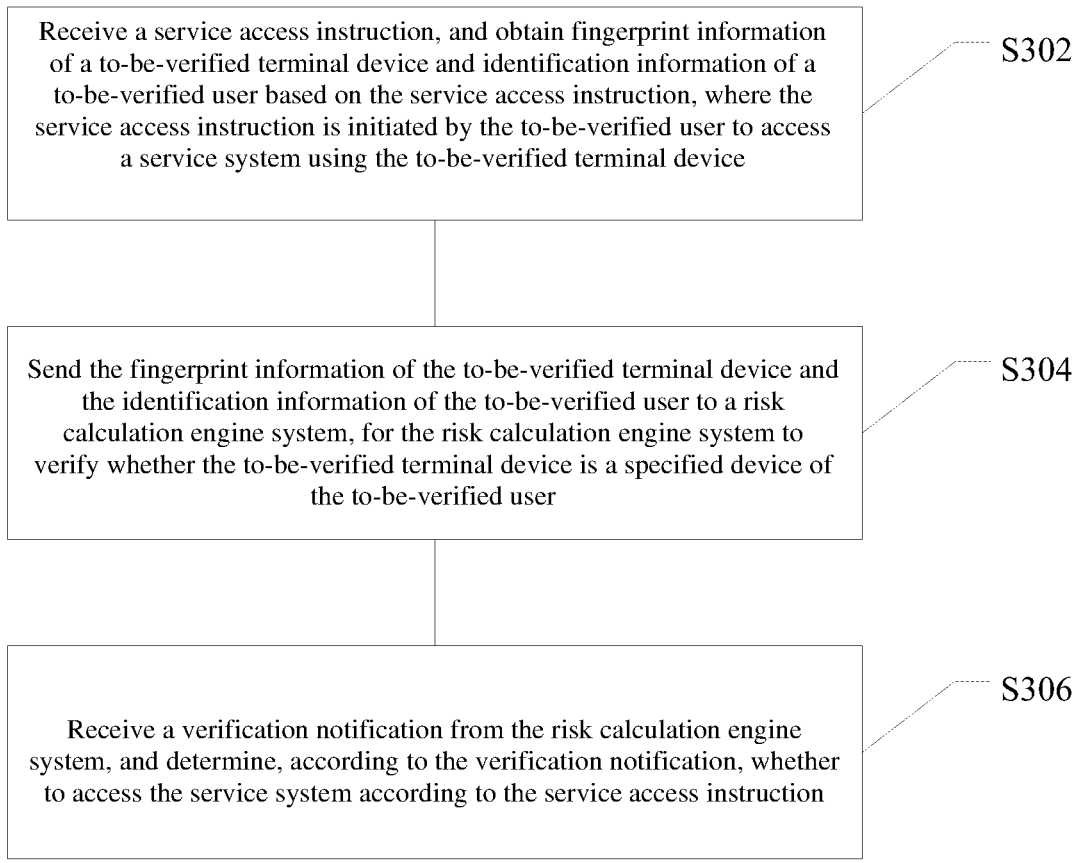
FIG. 3 is a another flowchart of a method for accessing a service system, according to an embodiment of the specification.

Based on the application scenario for accessing a service system shown in FIG. 1, an embodiment of the specification provides a method for accessing a service system. The login computer system may be, for example, an independent server, or may be a server cluster including a plurality of servers, which is not specially limited in this exemplary embodiment. FIG. 3 is a flowchart of a method for accessing a service server, according to an embodiment of the specification, including the following steps.

At Step S302, the method may include receiving a service access instruction, and receiving fingerprint information of a to-be-verified terminal device and identification information of a to-be-verified user based on the service access instruction, where the service access instruction is initiated by the to-be-verified user to a service system using the to-be-verified terminal device. The method may also include receiving the service access instruction from the to-be-verified user using the to-be-verified terminal device.

In this embodiment of the specification, if the to-be-verified user intends to initiate an instruction to the login computer system to the service system using the to-be-verified terminal device, the to-be-verified user may initiate the instruction to the login computer system to the service system using application software (for example, a browser) in the to-be-verified terminal device. Specifically, after receiving address information of the service system that is entered by the to-be-verified user, the application software obtains the identification information of the to-be-verified user and data of the to-be-verified terminal device, generates a service access instruction according to the identification information of the to-be-verified user, the data of the to-be-verified terminal device, and the address information of the service system, and initiates the instruction to the login computer system to the service system using the service access instruction.

The login computer system receives the service access instruction, and parses the service access instruction, to obtain data of the to-be-verified terminal device and the identification information of the to-be-verified user; then, generates fingerprint information corresponding to the to-be-verified terminal device according to the data of the to-be-verified terminal device. Specifically, the fingerprint information corresponding to the to-be-verified terminal device may be generated according to the data of the to-be-verified terminal device in combination with a preset calculation rule. The preset calculation rule may be, for example, a hash algorithm, which is not specially limited in this exemplary embodiment.

At Step S304, the method may include sending the fingerprint information of the to-be-verified terminal device and the identification information of the to-be-verified user to a risk calculation engine system, for the risk calculation engine system to verify whether the to-be-verified terminal device is a specified device of the to-be-verified user.

In this embodiment of the specification, the process in which the risk calculation engine system determines whether the to-be-verified terminal device is a specified device of the to-be-verified user according to the fingerprint information of the to-be-verified terminal device and the identification information of the to-be-verified user has been described above, and therefore, the details are not described herein again.

At Step S306, the method may include receiving a verification notification returned by the risk calculation engine system, and determine, according to the verification notification, whether to access the service system according to the service access instruction.

In this embodiment of the specification, if the verification notification is a verification success notification, that is, the to-be-verified terminal device is a specified device of the to-be-verified user, the service system is accessed according to the service access instruction. If the verification notification is a verification failure notification, that is, the to-be-verified terminal device is not a specified device of the to-be-verified user, authentication is performed on the to-be-verified user, and whether to access the service system according to the service access instruction is determined according to the performed authentication. Specifically, authentication may be performed on the to-be-verified user through one or more of human face verification, fingerprint verification, and iris verification.

The following describes, by using human face verification as an example, a process in which the login computer system performs authentication on the to-be-verified user. First, the login computer system initiates a human face verification request to the to-be-verified terminal device. The to-be-verified terminal device receives the human face verification request, starts a camera in the to-be-verified terminal device in response to the human face verification request, to obtain a human face image of the to-be-verified user using the camera, and uploads the human face image of the to-be-verified user to the login computer system. The login computer system receives the uploaded human face image of the to-be-verified user, obtains a human face image of the to-be-verified user from a personnel database, and finally, compares the uploaded human face image of the to-be-verified user with the human face image of the to-be-verified user in the personnel database. If the comparison succeeds, it is determined that the to-be-verified user is authenticated, or if the comparison fails, it is determined that the to-be-verified user is not authenticated.

If the to-be-verified user is authenticated, the login computer system accesses the service system according to the service access instruction, or if the to-be-verified user is not authenticated, access to the service system is prohibited. Authentication is performed on the to-be-verified user, that is, it is verified whether a current instruction on accessing the service system is initiated by the to-be-verified user, and if the authentication succeeds, that is, if the current instruction on accessing the service system is initiated by the to-be-verified user, the service system is accessed; otherwise, the current instruction to the service system is not initiated by the to-be-verified user, and access to the service system is prohibited.

It can be learned from the above that, when a user replaces a terminal device, because the replaced terminal device is not updated to a specified device of the user, the user may not log in to the service system using the replaced device. However, an instruction of the user on accessing the service system using the replaced terminal device is true and secure. Based on such a case, after it is determined that the to-be-verified terminal device is not a specified device of the to-be-verified user, whether a current service access instruction is initiated by the to-be-verified user is verified by performing authentication on the to-be-verified user, and when it is determined that the current service access instruction is initiated by the to-be-verified user, the service system is accessed according to the service access instruction, which can ensure that the user can still log in to the service system even after the device is replaced, thereby improving user experience and intercepting a network attack caused by loss or phishing of an account of the user.

It should be noted that, when the to-be-verified terminal device is not a specified device of the to-be-verified user and the to-be-verified user is authenticated, to help the to-be-verified user rapidly access the service system next time using the to-be-verified terminal device, after the to-be-verified user is authenticated, data of the to-be-verified terminal device may be obtained, fingerprint information corresponding to the to-be-verified terminal device may be generated according to the data of the to-be-verified terminal device, and the identification information of the to-be-verified user and the fingerprint information of the to-be-verified terminal device are associated with each other and then stored in a specified device database, that is, the to-be-verified terminal device is updated to a specified device of the to-be-verified user.

To ensure security of the to-be-verified terminal device and avoid attacks on the service system caused by vulnerabilities in the to-be-verified terminal device, virus Trojans, and the like, the method may further include: receiving security information related to the to-be-verified terminal device from the login computer system; and sending the security information related to the to-be-verified terminal device to the risk calculation engine system, for the risk calculation engine system to verify a security risk of the to-be-verified terminal device according to the security information related to the to-be-verified terminal device after verifying that the to-be-verified terminal device is a specified device of the to-be-verified user.

In this embodiment of the specification, a process in which the login computer system receives the security information related to the to-be-verified terminal device and the risk calculation engine system verifies the security risk of the to-be-verified terminal device according to the security information related to the to-be-verified terminal device has been described above, and therefore, the details are not described herein again.

The risk calculation engine system returns, to the login computer system, a verification notification of security risk performed on the to-be-verified terminal device, and if the verification notification is a verification success notification, that is, if the to-be-verified terminal device has no security risk, the login computer system accesses the service system according to the service access instruction; or if the verification notification is a verification failure notification, that is, if the to-be-verified terminal device has a security risk, the login computer system prohibits access to the service system according to the service access instruction.

It can be learned from the above that, when the to-be-verified terminal device is a specified device of the to-be-verified user and the to-be-verified terminal device has no security risk, the login computer system accesses the service system according to the service access instruction. In this way, a network attack caused by loss or phishing of an account of the to-be-verified user can be intercepted, and a network attack on the service system caused by vulnerabilities in the to-be-verified terminal device, virus Trojans, and the like can also be intercepted, thereby more effectively defending against the network attacks.

The login computer system sends to the risk calculation engine system, the fingerprint information of the to-be-verified terminal device and the identification information of the to-be-verified user that are obtained based on the service access instruction, and determines, according to the verification notification that is returned by the risk calculation engine system according to the identification information of the to-be-verified user and the fingerprint information of the to-be-verified terminal device and that is used for indicating whether the to-be-verified terminal device is a specified device of the to-be-verified user, whether to access the service system according to the service access instruction, that is, needs to determine, according to a result of the verifying indicating whether the to-be-verified terminal device is a specified device of the to-be-verified user, whether to access the service system. Therefore, a network attack caused by loss or phishing of an account of the to-be-verified user can be intercepted, thereby effectively defending against the network attack.

Figure 4:
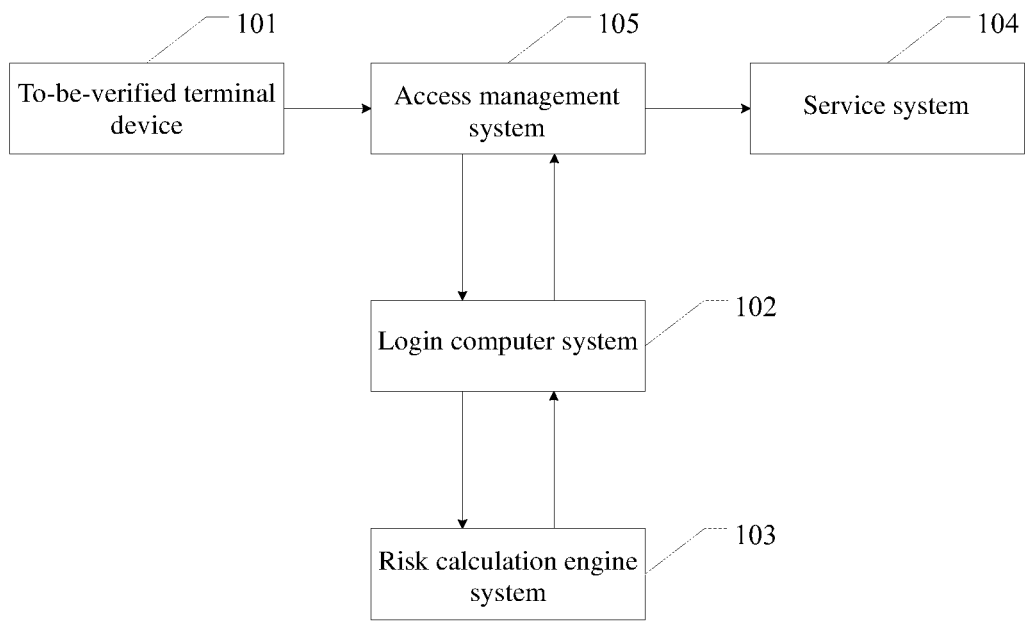
FIG. 4 is a schematic diagram of an application scenario for accessing a service system, according to an embodiment of the specification.

FIG. 4 is a schematic diagram of an application scenario for accessing a service system, according to an embodiment of the specification. As shown in FIG. 4, the application scenario includes a to-be-verified terminal device 101, a login computer system 102, a risk calculation engine system 103, a service system 104, and an access management system 105. The following describes a procedure for accessing a service system according to the application scenario of accessing a service system.

A to-be-verified user initiates an instruction to the service system 104 using the to-be-verified terminal device 101 for accessing the service system 104. For ease of subsequent description, the instruction is named as a service access instruction. The access management system 105 intercepts the service access instruction, determines whether the service access instruction includes a trusted identifier, and if the trusted identifier exists, verifies legality of the trusted identifier. If the trusted identifier is legal, the access management system 105 directly accesses the service system according to the service access instruction. If there is no trusted identifier in the service access instruction or the trusted identifier is illegal, the service access instruction is forwarded to the login computer system 102. The login computer system 102 receives the service access instruction forwarded by the access management system 105, receives fingerprint information of the to-be-verified terminal device 101 and identification information of the to-be-verified user based on the service access instruction, and sends the fingerprint information of the to-be-verified terminal device 101 and the identification information of the to-be-verified user to the risk calculation engine system 103.

The risk calculation engine system 103 verifies whether the to-be-verified terminal device 101 is a specified device of the to-be-verified user according to the fingerprint information of the to-be-verified terminal device 101 and the identification information of the to-be-verified user, and sends a result of the verifying to the login computer system 102.

The login computer system 102 receives the result of the verifying, and if the result of the verifying indicates that the to-be-verified terminal device 101 is a specified device of the to-be-verified user, the login computer system 102 generates a trusted identifier corresponding to the to-be-verified terminal device 101 and the to-be-verified user, adds the trusted identifier to the service access instruction, and sends the service access instruction to which the trusted identifier is added to the access management system 105. If the result of the verifying indicates that the to-be-verified terminal device 101 is not a specified device of the to-be-verified user, the login computer system 102 performs authentication on the to-be-verified user. If the authentication succeeds, the login computer system 102 generates a trusted identifier corresponding to the to-be-verified terminal device 101 and the to-be-verified user, adds the trusted identifier to the service access instruction, and sends the service access instruction to which the trusted identifier is added to the access management system 105. If the authentication fails, access to the service system 104 is prohibited.

The access management system 105 receives the service access instruction to which the trusted identifier is added, and verifies legality of the trusted identifier. If the trusted identifier is legal, the access management system 105 accesses the service system 104 according to the service access instruction to which the trusted identifier is added. If the trusted identifier is illegal, access to the service system 104 is prohibited.

Figure 5:
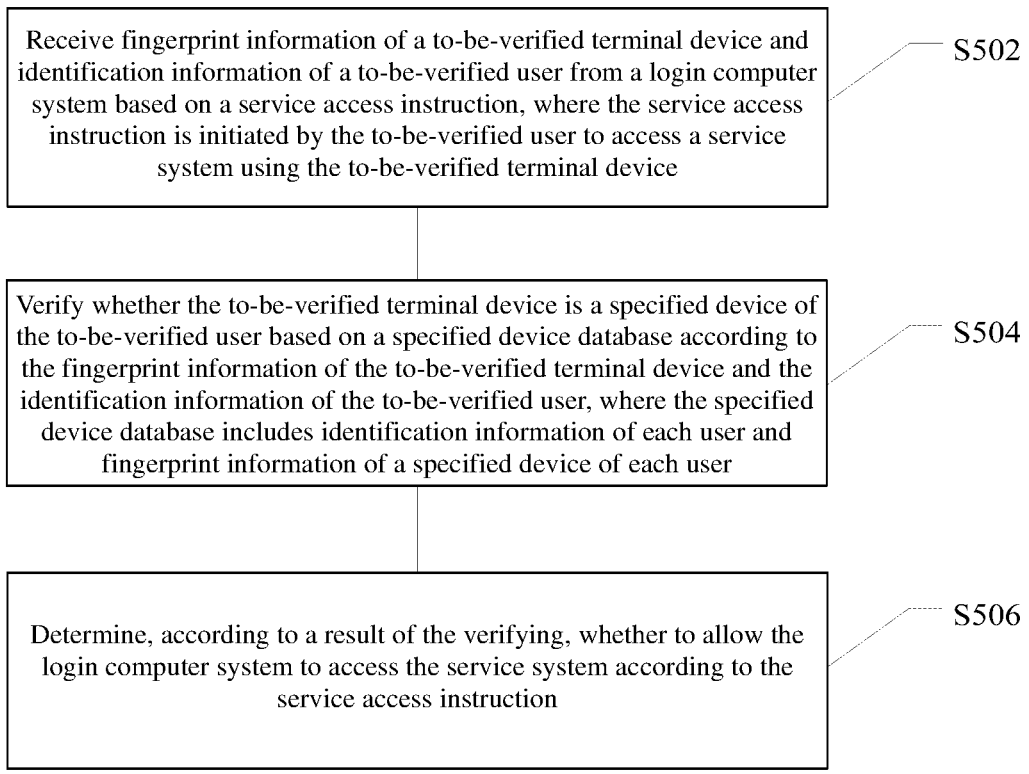
FIG. 5 is a another flowchart of a method for accessing a service system, according to an embodiment of the specification.

Based on the application scenario for accessing a service system shown in FIG. 4, an embodiment of the present application provides a method for accessing a service system, applied to a risk calculation engine system. The service system may be, for example, an independent server, or may be a server cluster including a plurality of servers, which is not specially limited in this exemplary embodiment. The risk calculation engine system may be, for example, an independent server, or may be a server cluster including a plurality of servers, which is not specially limited in this exemplary embodiment. FIG. 5 is a flowchart of a method for accessing a service system, according to an embodiment of the specification, including the following steps.

At Step S502, the method may include receiving fingerprint information of a to-be-verified terminal device and identification information of a to-be-verified user from a login computer system based on a service access instruction, where the service access instruction is initiated by the to-be-verified user to a service system using the to-be-verified terminal device. Specifically, the service access instruction is initiated by the to-be-verified user to the login computer system to access the service system using the to-be-verified terminal device, and the service access instruction is forwarded by the access management system to the login computer system when verifying that the service access instruction does not include a trusted identifier or the trusted identifier is illegal.

In some embodiments, if a user initially accesses the service system using a terminal device, the user may enter address information of the service system into application software (for example, a browser) in the terminal device. After receiving the address information of the service system, the application software provides a login page for the user. After the user enters account information into the login page, the application software obtains the account information, obtains identification information of the user from the account information, obtains data of the terminal device, generates a service access instruction according to the data of the terminal device, the identification information of the user, and the address information of the service system, and initiates access to the service system according to the service access instruction.

The access management system intercepts the service access instruction, and verifies whether the service access instruction includes a trusted identifier. Because the access is initial, the service access instruction does not include any trusted identifier. The access management system sends the service access instruction to the login computer system. The login computer system parses the service access instruction, obtains the data of the terminal device and the identification information of the user, generates fingerprint information of the terminal device according to the data of the terminal device, and sends the fingerprint information of the terminal device and the identification information of the user to the risk calculation engine system.

The risk calculation engine system sends a verification success notification to the login computer system when verifying that the terminal device is a specified device of the user according to the fingerprint information of the terminal device and the identification information of the user. The login computer system generates a trusted identifier corresponding to the terminal device and the user in response to the verification success notification, adds the trusted identifier to the service access instruction, and sends the service access instruction to which the trusted identifier is added to the access management system. The access management system verifies legality of the trusted identifier in the service access instruction to which the trusted identifier is added, and accesses the service system according to the service access instruction to which the trusted identifier is added when the trusted identifier is legal. The login computer system sends the generated trusted identifier to the application software of the terminal device. The application software stores the trusted identifier in association with the data of the terminal device and the identification information of the user.

If the risk calculation engine system verifies that the to-be-verified terminal device is not a specified device of the user, the risk calculation engine system returns a verification failure notification to the login computer system. The login computer system performs authentication on the user in response to the verification failure notification, if the authentication succeeds, generates a trusted identifier corresponding to the user and the to-be-verified terminal device, adds the trusted identifier to the service access instruction, and sends the service access instruction to which the trusted identifier is added to the access management system. The access management system verifies legality of the trusted identifier in the service access instruction to which the trusted identifier is added, and when the trusted identifier is legal, accesses the service system according to the service access instruction to which the trusted identifier is added. The login computer system sends the generated trusted identifier to the application software of the terminal device. The application software stores the trusted identifier in association with the data of the terminal device and the identification information of the user.

It should be noted that, a process of generating the trusted identifier uniquely corresponding to the user and the terminal device is: generating the trusted identifier uniquely corresponding to the terminal device and the user according to the data of the terminal device and the identification information of the user in combination with a preset calculation rule (for example, a hash algorithm).

When the user subsequently accesses the service system using the terminal device, the user may enter address information of the service system into application software (for example, a browser) in the terminal device. After receiving the address information of the service system, the application software receives data of the terminal device, receives identification information of the user from an access history record, queries for a trusted identifier corresponding to the terminal device and the user, generates a service access instruction according to the data of the terminal device, the identification information of the user, the found trusted identifier, and the address information of the service system, and initiates access to the service system using the service access instruction. The access management system intercepts the service access instruction, obtains the trusted identifier from the service access instruction, and verifies legality of the trusted identifier. If the trusted identifier is legal, the access management system accesses the service system according to the service access instruction. If the trusted identifier is illegal, the foregoing verification process is performed.

Based on this, if the to-be-verified user intends to initiate an instruction using the to-be-verified terminal device for accessing the service system, the to-be-verified user may initiate the instruction using the application software in the to-be-verified terminal device on accessing the service system. Specifically, after receiving the address information of the service system from the to-be-verified user, the application software receives the identification information of the to-be-verified user and the data of the to-be-verified terminal device, searches the application software for the trusted identifier corresponding to the to-be-verified terminal device and the to-be-verified user according to the identification information of the to-be-verified user and the data of the to-be-verified terminal device. If the trusted identifier is found, a service access instruction is generated according to the identification information of the to-be-verified user, the data of the to-be-verified terminal device, the trusted identifier, and the address information of the service system. If the trusted identifier is not found, a service access instruction is generated according to the identification information of the to-be-verified user, the data of the to-be-verified terminal device, and the address information of the service system. Access to the service system is initiated according to the generated service access instruction.

The access management system intercepts the service access instruction, parses the service access instruction, to receive the data of the to-be-verified terminal device, the identification information of the to-be-verified user, the address information of the service system, and the trusted identifier (the trusted identifier herein may exist or may not exist). The foregoing data obtained by parsing the service access instruction is searched for the trusted identifier, and if the trusted identifier is found, the service access instruction includes the trusted identifier, or if the trusted identifier is not found, the service access instruction does not include the trusted identifier.

If the service access instruction includes the trusted identifier, the trusted identifier is verified, and a specific verification process includes: calculating a trusted identifier corresponding to the to-be-verified terminal device and the to-be-verified user according to the data of the to-be-verified terminal device and the identification information of the to-be-verified user in combination with a preset calculation rule, matching the calculated trusted identifier with the trusted identifier obtained through parsing in the service access instruction, and if the matching succeeds, determining that the trusted identifier in the service access instruction is legal, or if the matching fails, determining that the trusted identifier in the service access instruction is illegal. If the trusted identifier in the service access instruction is legal, the access management system directly accesses the service system according to the service access instruction. If the trusted identifier in the service access instruction is illegal or the service access instruction does not include any trusted identifier, the access management system forwards the service access instruction to the login computer system.

The login computer system parses the service access instruction, to receive the data of the to-be-verified terminal device and the identification information of the to-be-verified user, and generates fingerprint information of the to-be-verified terminal device according to the data of the to-be-verified terminal device. A process of generating the fingerprint information of the to-be-verified terminal is to be described below, and therefore, details are not described herein. The login computer system sends the fingerprint information of the to-be-verified terminal device and the identification information of the to-be-verified user to the risk calculation engine system. The risk calculation engine system receives the identification information of the to-be-verified user and the fingerprint information of the to-be-verified terminal device.

At Step S504, the method may include verify whether the to-be-verified terminal device is a specified device of the to-be-verified user based on a specified device database according to the fingerprint information of the to-be-verified terminal device and the identification information of the to-be-verified user, where the specified device database includes identification information of each user and fingerprint information of a specified device of each user. Because the process has been described above, the details are not described herein again.

At Step S506, the method may include determining, according to a result of the verifying, whether to allow the login computer system to access the service system according to the service access instruction.

In some embodiments, if the to-be-verified terminal device is a specified device of the to-be-verified user, a verification success notification is sent to the login computer system, for the login computer system to generate a trusted identifier corresponding to the to-be-verified terminal device and the to-be-verified user in response to the verification success notification, and for the access management system to access the service system according to the service access instruction to which the trusted identifier is added. If the to-be-verified terminal device is not a specified device of the to-be-verified user, a verification failure notification is sent to the login computer system, for the login computer system to perform authentication on the to-be-verified user in response to the verification failure notification and determine, according to the performed authentication, whether to generate a trusted identifier corresponding to the to-be-verified terminal device and the to-be-verified user. It should be noted that, a process of performing authentication on the to-be-verified user and a process of generating a trusted identifier corresponding to the to-be-verified terminal device and the to-be-verified user are to be described below, and therefore, details are not described herein.

The risk calculation engine system verifies whether the to-be-verified terminal device is a specified device of the to-be-verified user based on the specified device database according to the fingerprint information of the to-be-verified terminal device and the identification information of the to-be-verified user; determines, according to the result of the verifying, whether to allow the login computer system to access the service system according to the service access instruction, that is, during access to the service system, verifies whether the to-be-verified terminal device used by the to-be-verified user to initiate the service access instruction is a specified device of the to-be-verified user; and determines, according to the result of the verifying, whether to perform access. In this way, a network attack caused by loss or phishing of an account of the to-be-verified user can be intercepted, thereby effectively defending against the network attack. In addition, the verification step is simple and easy to perform, and therefore, verification efficiency is relatively high. In addition, if the access management system verifies that the service access instruction includes a trusted identifier and the trusted identifier is legal, the access management system directly accesses the service system without verification, and a subsequent verification process is performed only when the service access instruction does not include any trusted identifier or the trusted identifier is illegal. Therefore, access efficiency is improved while access security is ensured, and user experience is better. In addition, there is no access system for the access management system, and to intercept an attack on the service system, the service system needs to be connected to the login computer system. Therefore, problems such as protocol interworking and interface connection between the login computer system and the service system may need to be resolved through development. Particularly, workload is heavy and costs are high when a plurality of different service systems need to be connected to the login computer system. However, in some embodiments, all instructions on accessing the service system are centrally intercepted and processed by the access management system. Therefore, only the access management system may need to be connected to the login computer system, and the service system may not need to be connected to the login computer system, so that connections between the login computer system and the service system are not necessarily developed, thereby greatly reducing the workload and costs.

To ensure security of the to-be-verified terminal device and avoid attacks on the service system due to vulnerabilities in the to-be-verified terminal device, virus Trojans, and the like, the method may further include: receiving security information related to the to-be-verified terminal device from the login computer system. Because the security information related to the to-be-verified terminal device has been described above, the details are not described herein again.

The determining, according to a result of the verifying, whether to allow the login computer system to access the service system according to the service access instruction includes: if the to-be-verified terminal device is a specified device of the to-be-verified user, performing security risk verification on the to-be-verified terminal device according to the security information related to the to-be-verified terminal device; and determining, according to a result of security risk verification, whether to allow the login computer system to access the service system according to the service access instruction.

In some embodiments, the process of performing security risk verification on the to-be-verified terminal device has been described above, and therefore, the details are not described herein again.

The determining, according to a result of security risk verification, whether to allow the login computer system to access the service system according to the service access instruction includes: if the result of security risk verification indicates that the to-be-verified terminal device has no security risk, sending a verification success notification to the login computer system, for the login computer system to generate a trusted identifier corresponding to the to-be-verified terminal device and the to-be-verified user in response to the verification success notification, add the generated trusted identifier to the service access instruction, and send the service access instruction to which the trusted identifier is added to the access management system, for the access management system to access the service system according to the service access instruction to which the trusted identifier is added; or if the result of security risk verification indicates that the to-be-verified terminal device has a security risk, sending a verification failure notification to the login computer system, for the login computer system to prohibit, according to the verification failure notification, the access management system from accessing the service system based on the service access instruction.

After it is determined that the to-be-verified terminal device is a specified device of the to-be-verified user, the security risk of the to-be-verified terminal device is verified, and when the to-be-verified terminal device has no security risk, the login computer system generates the trusted identifier corresponding to the to-be-verified terminal device and the to-be-verified user, and adds the trusted identifier to the service access instruction, for the access management system to access the service system according to the service access instruction to which the trusted identifier is added, which ensures that the to-be-verified terminal device to which the to-be-verified user initiates the service access instruction is a specified device of the to-be-verified user, and the specified device does not have a security risk. Therefore, a network attack caused by loss or phishing of an account of the to-be-verified user can be intercepted, and a network attack on the service system caused by vulnerabilities in the to-be-verified terminal device, virus Trojans, and the like can also be intercepted, thereby more effectively defending against the network attacks.

Figure 6:
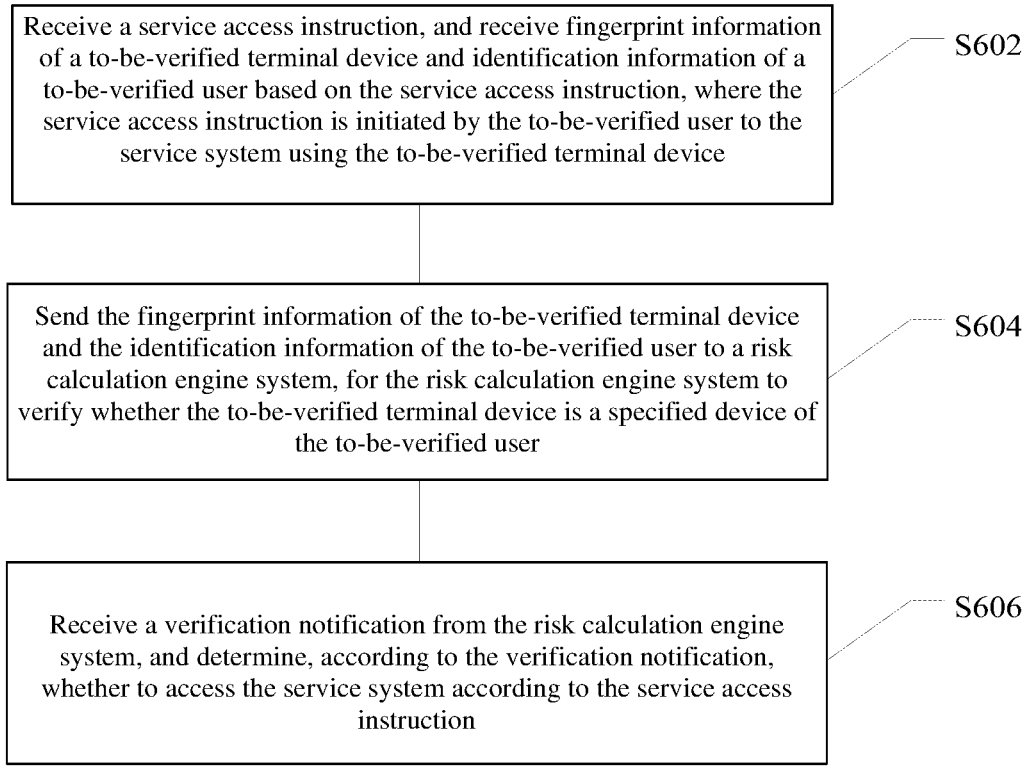
FIG. 6 is a another flowchart of a method for accessing a service system, according to an embodiment of the specification.

Based on the application scenario for accessing a service system shown in FIG. 4, an embodiment of the specification provides a method for accessing a service system, applied to a login computer system. The service system may be, for example, an independent server, or may be a server cluster including a plurality of servers, which is not specially limited in this exemplary embodiment. The login computer system may be, for example, an independent server, or may be a server cluster including a plurality of servers, which is not specially limited in this exemplary embodiment. FIG. 6 is a flowchart of a method for accessing a service system, according to an embodiment of the specification, including the following steps.

At Step S602, the method may include receiving a service access instruction, and receiving fingerprint information of a to-be-verified terminal device and identification information of a to-be-verified user based on the service access instruction, where the service access instruction is initiated by the to-be-verified user to access a service system using the to-be-verified terminal device; and specifically, receive a service access instruction from an access management system, where the service access instruction is forwarded by the access management system to the login computer system when verifying that the service access instruction does not include a trusted identifier or the trusted identifier is illegal.

In some embodiments, if the to-be-verified user intends to access the service system, the to-be-verified user may generate the service access instruction in the manner described above in step S502, and initiate access to the service system according to the service access instruction. The access management system intercepts the service access instruction, and parses the service access instruction, to determine whether the service access instruction includes a trusted identifier. If the service access instruction includes a trusted identifier, and the trusted identifier is legal, the access management system directly accesses the service system according to the service access instruction. If the service access instruction does not include a trusted identifier or the trusted identifier is illegal, the service access instruction is forwarded to the login computer system. The login computer system receives fingerprint information of a to-be-verified terminal device and identification information of a to-be-verified user based on the service access instruction includes: parsing the service access instruction, to receive the identification information of the to-be-verified user and data of the to-be-verified terminal device, and calculating the fingerprint information corresponding to the to-be-verified terminal device according to the data of the to-be-verified terminal device in combination with a preset calculation rule (for example, a hash algorithm).

At Step S604, the method may include sending the fingerprint information of the to-be-verified terminal device and the identification information of the to-be-verified user to a risk calculation engine system, for the risk calculation engine system to verify whether the to-be-verified terminal device is a specified device of the to-be-verified user. In some embodiments, the principle for the risk calculation engine system to verify whether the to-be-verified terminal device is a specified device of the to-be-verified user according to the fingerprint information of the to-be-verified terminal device and the identification information of the to-be-verified user has been described above, and therefore, the details are not described herein again.

At Step S606, the method may include receiving a verification notification from the risk calculation engine system, and determine, according to the verification notification, whether to access the service system according to the service access instruction.

In some embodiments, if the verification notification is a verification success notification, that is, if the to-be-verified terminal device is a specified device of the to-be-verified user, a trusted identifier corresponding to the to-be-verified terminal device and the to-be-verified user is generated, and the trusted identifier is added to the service access instruction, for the access management system to access the service system according to the service access instruction to which the trusted identifier is added. Specifically, the process of generating a trusted identifier corresponding to the to-be-verified terminal device and the to-be-verified user may include: generating the trusted identifier corresponding to the to-be-verified terminal device and the to-be-verified user according to the data of the to-be-verified terminal device and the identification information of the to-be-verified user in combination with a preset calculation rule (for example, a hash algorithm). The login computer system adds the generated trusted identifier to the service access instruction, and sends the service access instruction to which the trusted identifier is added to the access management system. The access management system receives the service access instruction to which the trusted identifier is added, and verifies the trusted identifier added to the service access instruction. A specific verification process includes: parsing a service access system to which the trusted identifier is added, to obtain the data of to-be-verified terminal device, the identification information of the to-be-verified user, and the added trusted identifier; and calculating a trusted identifier corresponding to the to-be-verified terminal device and the to-be-verified user according to the data of the to-be-verified terminal and the identification information of the to-be-verified user in combination with a preset calculation rule (for example, a hash algorithm), matching the calculated trusted identifier with the added trusted identifier, and if the matching succeeds, determining that the added trusted identifier is legal, or if the matching fails, determining that the added trusted identifier is illegal. If the added trusted identifier is legal, the access management system accesses the service system according to the service access instruction to which the trusted identifier is added.

If the verification notification is a verification failure notification, that is, the to-be-verified terminal device is not a specified device of the to-be-verified user, authentication is performed on the to-be-verified user, and it is determined, according to the performed authentication, whether to generate a trusted identifier corresponding to the to-be-verified terminal device and the to-be-verified user. Specifically, the principle for performing authentication on the to-be-verified user has been described above, and therefore, the details are not described herein again. If the login computer system determines that the to-be-verified user is authenticated, a trusted identifier corresponding to the to-be-verified terminal device and the to-be-verified user is calculated according to the data of the to-be-verified terminal device and the identification information of the to-be-verified user in combination with a preset calculation rule, the trusted identifier is added to the service access instruction, and the service access instruction to which the trusted identifier is added is sent to the access management system. The access management system accesses the service system according to the service access instruction to which the trusted identifier is added. The process in which the access management system accesses the service system according to the service access instruction to which the trusted identifier is added has been described above, and therefore, the details are not described herein again. If the login computer system determines that the to-be-verified user is not authenticated, the access management system is prohibited from accessing the service system according to the service access instruction.

It can be learned from the above that, when a user replaces a terminal device, because the replaced terminal device is not updated to a specified device of the user, the user may not log in to the service system using the replaced device. However, an instruction of the user on accessing the service system using the replaced terminal device is true and secure. Accordingly, after it is determined that the to-be-verified terminal device is not a specified device of the to-be-verified user, whether the service access instruction is initiated by the to-be-verified user is verified by performing authentication on the to-be-verified user, and when it is determined that the service access instruction is initiated by the to-be-verified user, a trusted identifier corresponding to the to-be-verified terminal device and the to-be-verified user is generated, and the trusted identifier is added to the service access instruction, for the access management system to access the service system according to the service access instruction to which the trusted identifier is added. In this way, which can ensure that the user can still log in to the service system even after the device is replaced, thereby improving user experience and avoiding a network attack caused by loss or phishing of an account of the user.

It should be noted that, when the to-be-verified terminal device is not a specified device of the to-be-verified user and the to-be-verified user is authenticated, to help the to-be-verified user rapidly access the service system next time by using the to-be-verified terminal device, after the to-be-verified user is authenticated, data of the to-be-verified terminal device may be received, fingerprint information corresponding to the to-be-verified terminal device may be generated according to the data of the to-be-verified terminal device, and the identification information of the to-be-verified user and the fingerprint information of the to-be-verified terminal device are associated with each other and then stored in a specified device database.

In addition, to help the to-be-verified user rapidly access the service system subsequently by using the to-be-verified terminal device, after the trusted identifier corresponding to the to-be-verified terminal device and the to-be-verified user is generated, the trusted identifier is associated with the data of the to-be-verified terminal device and the identification information of the to-be-verified user and is stored in application software.

To ensure security of the to-be-verified terminal device and avoid attacks on the service system due to vulnerabilities in the to-be-verified terminal device, virus Trojans, and the like, the method may further include: receiving security information related to the to-be-verified terminal device; and sending the security information related to the to-be-verified terminal device to the risk calculation engine system, for the risk calculation engine system to verify a security risk of the to-be-verified terminal device according to the security information related to the to-be-verified terminal device after verifying that the to-be-verified terminal device is a specified device of the to-be-verified user.

In this embodiment of the present application, a process in which the login computer system obtains the security information related to the to-be-verified terminal device and the risk calculation engine system verifies the security risk of the to-be-verified terminal device according to the security information related to the to-be-verified terminal device has been described above, and therefore, the details are not described herein again.

The risk calculation engine system returns, to the login computer system, a verification notification of the security risk performed on the to-be-verified terminal device, and if the verification notification is a verification success notification, that is, if the to-be-verified terminal device has no security risk, the login computer system generates a trusted identifier according to the data of the to-be-verified terminal device and the identification information of the to-be-verified user, adds the trusted identifier to the service access instruction, and sends the service access instruction to which the trusted identifier is added to the access management system, for the access management system to access the service system according to the service access instruction to which the trusted identifier is added. If the verification notification is a verification failure notification, that is, if the to-be-verified terminal device has a security risk, the login computer system prohibits the access management system from accessing the service system according to the service access instruction.

It can be learned from the above that, when the to-be-verified terminal device is a specified device of the to-be-verified user and the to-be-verified terminal device has no security risk, the trusted identifier corresponding to the to-be-verified terminal device and the to-be-verified user is generated, and the trusted identifier is added to the service access instruction, for the access management system to access the service system according to the service access instruction to which the trusted identifier is added. In this way, a network attack caused by loss or phishing of an account of the to-be-verified user can be intercepted, and a network attack on the service system caused by vulnerabilities in the to-be-verified terminal device, virus Trojans, and the like can also be intercepted, thereby more effectively defending against the network attacks.

The login computer system sends to the risk calculation engine system, the fingerprint information of the to-be-verified terminal device and the identification information of the to-be-verified user that are received based on the service access instruction, and determines, according to the verification notification from the risk calculation engine system according to the identification information of the to-be-verified user and the fingerprint information of the to-be-verified terminal device and that is used for indicating whether the to-be-verified terminal device is a specified device of the to-be-verified user, whether to access the service system according to the service access instruction, that is, needs to determine, according to a result of the verifying indicating whether the to-be-verified terminal device is a specified device of the to-be-verified user, whether to access the service system. Therefore, a network attack caused by loss or phishing of an account of the to-be-verified user can be intercepted, thereby effectively defending against the network attack.

Figure 7:
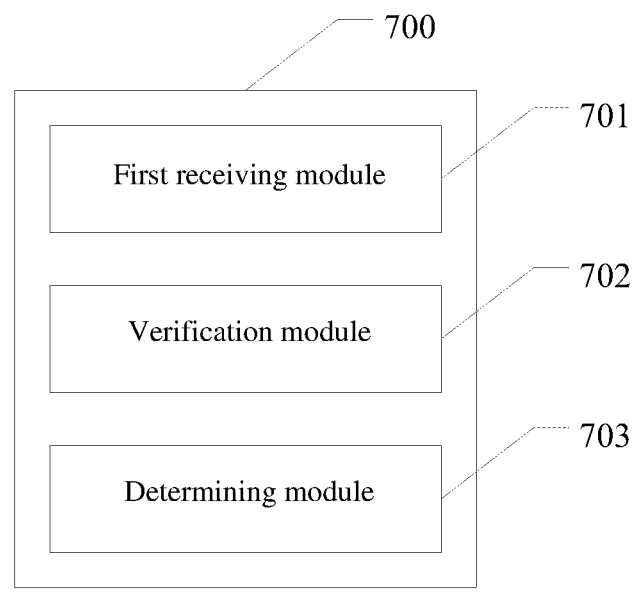
FIG. 7 is a block diagram of an apparatus for accessing a service system, according to an embodiment of the specification.

Corresponding to the service system access method applied to the risk calculation engine system, based on a same technical idea, an embodiment of the specification further provides an apparatus for accessing a service system, applied to a risk calculation engine system. FIG. 7 is a block diagram of an apparatus for accessing a service system, according to an embodiment of the specification. The apparatus is used for implementing the method for accessing the service system applied to the risk calculation engine system. As shown in FIG. 7, the apparatus 700 may include a first receiving module 701, a verification module 702, and a determining module 703.

The first receiving module 701 is configured to receive fingerprint information of a to-be-verified terminal device and identification information of a to-be-verified user from a login computer system based on a service access instruction, where the service access instruction is initiated by the to-be-verified user to access a service system using the to-be-verified terminal device.

The verification module 702 is configured to verify whether the to-be-verified terminal device is a specified device of the to-be-verified user based on a specified device database according to the fingerprint information of the to-be-verified terminal device and the identification information of the to-be-verified user, where the specified device database includes identification information of each user and fingerprint information of a specified device of each user.

The determining module 703 is configured to determine, according to a result of the verifying, whether to allow the login computer system to access the service system according to the service access instruction.

In some embodiments, the apparatus 700 may further include: a second receiving module, configured to receive security information related to the to-be-verified terminal device and sent by the login computer system; and the determining module includes: a verification unit, configured to: if the to-be-verified terminal device is a specified device of the to-be-verified user, perform security risk verification on the to-be-verified terminal device according to the security information related to the to-be-verified terminal device; and a determining unit, configured to determine, according to a result of security risk verification, whether to allow the login computer system to access the service system according to the service access instruction.

In some embodiments, the service access instruction is initiated by the to-be-verified user to the login computer system to access the service system using the to-be-verified terminal device; and the determining module 703 may include: a first sending unit, configured to: if the to-be-verified terminal device is a specified device of the to-be-verified user, send a verification success notification to the login computer system, for the login computer system to access the service system according to the service access instruction in response to the verification success notification; and a second sending unit, configured to: if the to-be-verified terminal device is not a specified device of the to-be-verified user, send a verification failure notification to the login computer system, for the login computer system to perform authentication on the to-be-verified user in response to the verification failure notification and determine, according to the performed authentication, whether to access the service system according to the service access instruction.

In some embodiments, the service access instruction is initiated by the to-be-verified user to access the service system using the to-be-verified terminal device; and the service access instruction is forwarded by an access management system to the login computer system when verifying that the service access instruction does not include a trusted identifier or the trusted identifier is illegal.

In some embodiments, the determining module 703 may include: a third sending unit, configured to: if the to-be-verified terminal device is a specified device of the to-be-verified user, send a verification success notification to the login computer system, for the login computer system to generate a trusted identifier corresponding to the to-be-verified terminal device and the to-be-verified user in response to the verification success notification, and for the access management system to access the service system according to the service access instruction to which the trusted identifier is added; and a fourth sending unit, configured to: if the to-be-verified terminal device is not a specified device of the to-be-verified user, send a verification failure notification to the login computer system, for the login computer system to perform authentication on the to-be-verified user in response to the verification failure notification and determine, according to the performed authentication, whether to generate a trusted identifier corresponding to the to-be-verified terminal device and the to-be-verified user.

The apparatus for accessing the service system in this embodiment of the specification verifies whether the to-be-verified terminal device is a specified device of the to-be-verified user based on the specified device database according to the fingerprint information of the to-be-verified terminal device and the identification information of the to-be-verified user; determines, according to the result of the verifying, whether to allow the login computer system to access the service system according to the service access instruction, that is, during access to the service system, verifies whether the to-be-verified terminal device used by the to-be-verified user to initiate the service access instruction is a specified device of the to-be-verified user; and determines, according to the result of the verifying, whether to perform access. Therefore, a network attack caused by loss or phishing of an account of the to-be-verified user can be intercepted, thereby effectively defending against the network attack. In addition, the verification step is simple and easy to perform, and therefore, verification efficiency is relatively high.

Figure 8:
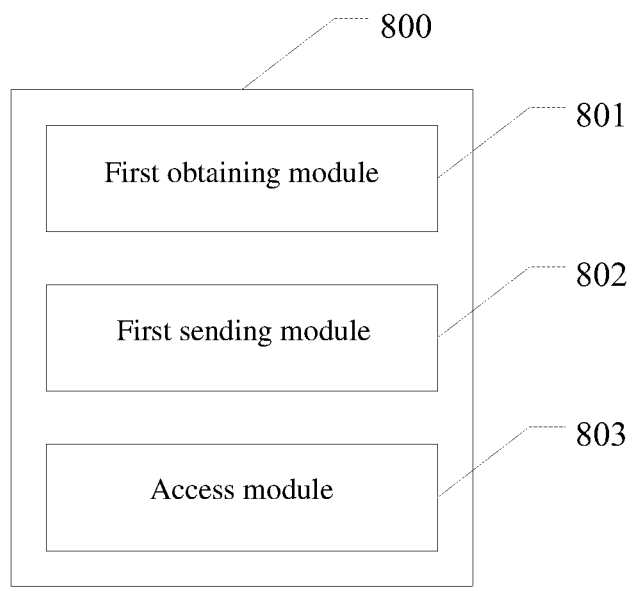
FIG. 8 is a another block diagram of an apparatus for accessing a service system, according to an embodiment of the specification.

Corresponding to the service system access method applied to the login computer system, based on a same technical idea, an embodiment of the specification further provides an apparatus for accessing a service system, applied to a login computer system. FIG. 8 is a block diagram of an apparatus for accessing a service system, according to an embodiment of the specification. The apparatus is used for implementing the method for accessing the service system, applied to the login computer system. As shown in FIG. 8, the apparatus 800 may include a first obtaining module 801, a first sending module 802, and an access module 803.

The first obtaining module 801 is configured to receive a service access instruction, and receive fingerprint information of a to-be-verified terminal device and identification information of a to-be-verified user based on the service access instruction, where the service access instruction is initiated by the to-be-verified user to access the service system using the to-be-verified terminal device. The first sending module 802 is configured to send the fingerprint information of the to-be-verified terminal device and the identification information of the to-be-verified user to a risk calculation engine system, for the risk calculation engine system to verify whether the to-be-verified terminal device is a specified device of the to-be-verified user. The access module 803 is configured to receive a verification notification from the risk calculation engine system, and determine, according to the verification notification, whether to access the service system according to the service access instruction.

In some embodiments, the first obtaining module includes a receiving unit, and the receiving unit is configured to receive the service access instruction from the to-be-verified user using the to-be-verified terminal device.

The access module includes a determining unit, and the determining unit is configured to: if the verification notification is a verification success notification, access the service system according to the service access instruction; or if the verification notification is a verification failure notification, perform authentication on the to-be-verified user, and determine, according to the performed authentication, whether to access the service system according to the service access instruction.

In some embodiments, the first obtaining module includes a receiving unit, and the receiving unit is configured to receive a service access instruction from an access management system, where the service access instruction is forwarded by the access management system to the login computer system when verifying that the service access instruction does not include a trusted identifier or the trusted identifier is illegal.

The access module includes a determining unit, and the determining unit is configured to: if the verification notification is a verification success notification, generate a trusted identifier corresponding to the to-be-verified terminal device and the to-be-verified user, and add the trusted identifier to the service access instruction, for the access management system to access the service system according to the service access instruction to which the trusted identifier is added; or if the verification notification is a verification failure notification, perform authentication on the to-be-verified user, and determine, according to the performed authentication, whether to generate a trusted identifier corresponding to the to-be-verified terminal device and the to-be-verified user.

In some embodiments, the apparatus 800 may further include: a second obtaining module, configured to obtain security information related to the to-be-verified terminal device; and a second sending module, configured to send the security information related to the to-be-verified terminal device to the risk calculation engine system, for the risk calculation engine system to verify a security risk of the to-be-verified terminal device according to the security information related to the to-be-verified terminal device after verifying that the to-be-verified terminal device is a specified device of the to-be-verified user.

The service system access apparatus in this embodiment of the specification sends, to the risk calculation engine system, the fingerprint information of the to-be-verified terminal device and the identification information of the to-be-verified user that are obtained based on the service access instruction, and determines, according to the verification notification from the risk calculation engine system according to the identification information of the to-be-verified user and the fingerprint information of the to-be-verified terminal device and that is used for indicating whether the to-be-verified terminal device is a specified device of the to-be-verified user, whether to access the service system according to the service access instruction, that is, needs to determine, according to a result of the verifying indicating whether the to-be-verified terminal device is a specified device of the to-be-verified user, whether to access the service system. Therefore, a network attack caused by loss or phishing of an account of the to-be-verified user can be intercepted, thereby effectively defending against the network attack.

Figure 9:
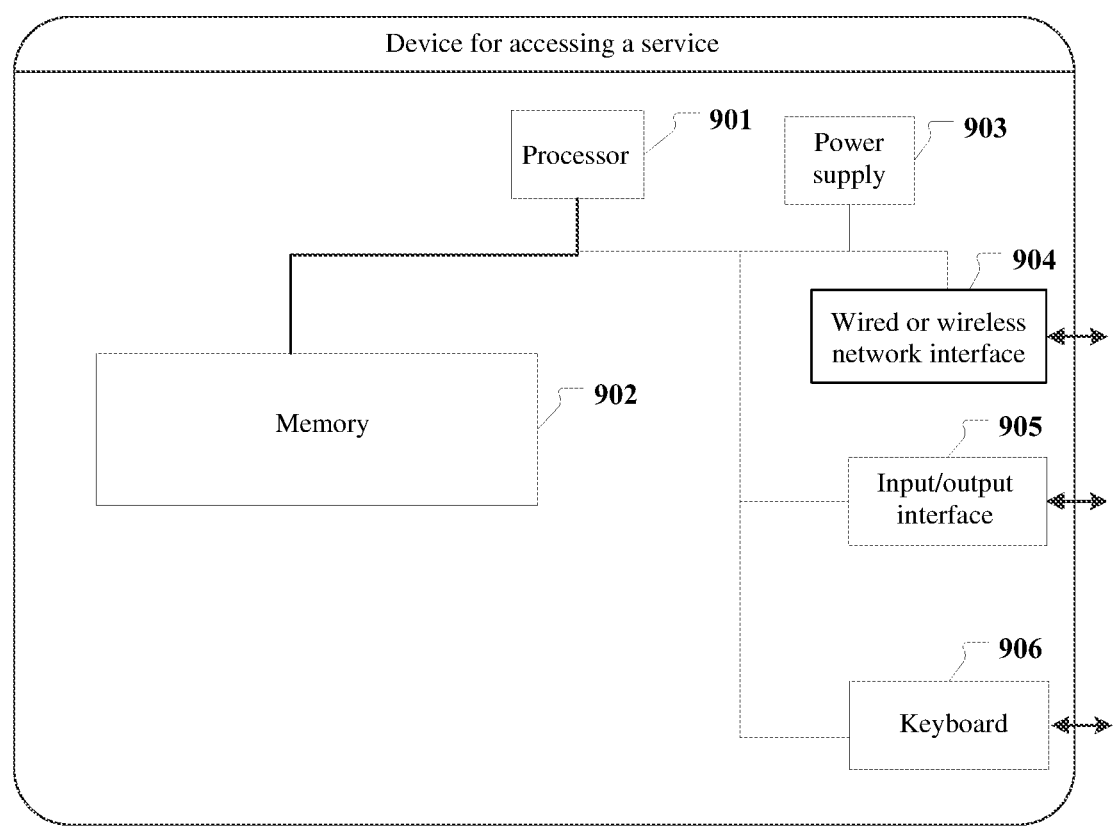
FIG. 9 is a schematic structural diagram of a device for accessing a service system, according to an embodiment of the specification.

Corresponding to the service system access method, based on a same technical idea, an embodiment of the present application further provides a service system access device. FIG. 9 is a schematic structural diagram of a device for accessing a service system, according to an embodiment of the specification. The device is configured to perform the method for accessing the service system.

As shown in FIG. 9, the device for accessing the service system may vary greatly due to different configurations or performance, and may include one or more processors 901 and a memory 902. The memory 902 may store one or more application programs or data. The memory 902 may perform transient storage or persistent storage. The programs stored in the memory 902 may include one or more modules (not shown in the figure), and each module may include a series of computer-executable instructions on the service system access device. Further, the processor 901 may be configured to communicate with the memory 902, and execute, on the service system access device, a series of computer-executable instructions in the memory 902. The service system access device may further include one or more power supplies 903, one or more wired or wireless network interfaces 904, one or more input/output interfaces 905, one or more keyboards 906, and the like.

In a specific embodiment, the device for accessing the service system is applied to a risk calculation engine system. The device for accessing the service system includes a memory and one or more programs, where the one or more programs are stored in the memory, and the one or more programs may include one or more modules. Each module may include a series of computer-executable instructions on a security check-in device, and the one or more programs configured to be executed by the one or more processors include the computer-executable instructions for performing the following steps: receive fingerprint information of a to-be-verified terminal device and identification information of a to-be-verified user from a login computer system based on a service access instruction, where the service access instruction is initiated by the to-be-verified user to access a service system using the to-be-verified terminal device; verify whether the to-be-verified terminal device is a specified device of the to-be-verified user based on a specified device database according to the fingerprint information of the to-be-verified terminal device and the identification information of the to-be-verified user, where the specified device database includes identification information of each user and fingerprint information of a specified device of each user; and determine, according to a result of the verifying, whether to allow the login computer system to access the service system according to the service access instruction.

In some embodiments, when the computer executable instruction is executed, the following is further included: receiving security information related to the to-be-verified terminal device from the login computer system; and the determining, according to a result of the verifying, whether to allow the login computer system to access the service system according to the service access instruction includes: if the to-be-verified terminal device is a specified device of the to-be-verified user, performing security risk verification on the to-be-verified terminal device according to the security information related to the to-be-verified terminal device; and determining, according to a result of security risk verification, whether to allow the login computer system to access the service system according to the service access instruction.

In some embodiments, when the computer executable instruction is executed, the service access instruction is initiated by the to-be-verified user to the login computer system to access the service system using the to-be-verified terminal device; and the determining, according to a result of the verifying, whether to allow the login computer system to access the service system according to the service access instruction includes: if the to-be-verified terminal device is a specified device of the to-be-verified user, sending a verification success notification to the login computer system, for the login computer system to access the service system according to the service access instruction in response to the verification success notification; or if the to-be-verified terminal device is not a specified device of the to-be-verified user, sending a verification failure notification to the login computer system, for the login computer system to perform authentication on the to-be-verified user in response to the verification failure notification and determine, according to the performed authentication, whether to access the service system according to the service access instruction.

In some embodiments, when the computer executable instruction is executed, the service access instruction is initiated by the to-be-verified user to the service system to access the service system using the to-be-verified terminal device; and the service access instruction is forwarded by an access management system to the login computer system when verifying that the service access instruction does not include a trusted identifier or the trusted identifier is illegal.

In some embodiments, when the computer executable instruction is executed, the determining, according to a result of the verifying, whether to allow the login computer system to access the service system according to the service access instruction includes: if the to-be-verified terminal device is a specified device of the to-be-verified user, sending a verification success notification to the login computer system, for the login computer system to generate a trusted identifier corresponding to the to-be-verified terminal device and the to-be-verified user in response to the verification success notification, and for the access management system to access the service system according to the service access instruction to which the trusted identifier is added; or if the to-be-verified terminal device is not a specified device of the to-be-verified user, sending a verification failure notification to the login computer system, for the login computer system to perform authentication on the to-be-verified user in response to the verification failure notification and determine, according to the performed authentication, whether to generate a trusted identifier corresponding to the to-be-verified terminal device and the to-be-verified user.

The service system access device in this embodiment of the specification verifies whether the to-be-verified terminal device is a specified device of the to-be-verified user based on the specified device database according to the fingerprint information of the to-be-verified terminal device and the identification information of the to-be-verified user; determines, according to the result of the verifying, whether to allow the login computer system to access the service system according to the service access instruction, that is, during access to the service system, verifies whether the to-be-verified terminal device used by the to-be-verified user to initiate the service access instruction is a specified device of the to-be-verified user; and determines, according to the result of the verifying, whether to perform access. Therefore, a network attack caused by loss or phishing of an account of the to-be-verified user can be intercepted, thereby effectively defending against the network attack. In addition, the verification step is simple and easy to perform, and therefore, verification efficiency is relatively high.

In another specific embodiment, the service system access device is applied to a login computer system. The service system access device includes a memory and one or more programs, where the one or more programs are stored in the memory, and the one or more programs may include one or more modules. Each module may include a series of computer-executable instructions on the service system access device, and the one or more programs configured to be executed by the one or more processors include the computer-executable instructions for performing the following steps: receiving a service access instruction, and receiving fingerprint information of a to-be-verified terminal device and identification information of a to-be-verified user based on the service access instruction, where the service access instruction is initiated by the to-be-verified user to access the service system using the to-be-verified terminal device; sending the fingerprint information of the to-be-verified terminal device and the identification information of the to-be-verified user to a risk calculation engine system, for the risk calculation engine system to verify whether the to-be-verified terminal device is a specified device of the to-be-verified user; and receiving a verification notification from the risk calculation engine system, and determining, according to the verification notification, whether to access the service system according to the service access instruction.

In some embodiments, when the computer executable instruction is executed, the receiving a service access instruction includes: receiving the service access instruction from the to-be-verified user using the to-be-verified terminal device; and the determining, according to the verification notification, whether to access the service system according to the service access instruction includes: if the verification notification is a verification success notification, accessing the service system according to the service access instruction; or if the verification notification is a verification failure notification, performing authentication on the to-be-verified user, and determining, according to the performed authentication, whether to access the service system according to the service access instruction.

In some embodiments, when the computer executable instruction is executed, the receiving a service access instruction includes: receiving a service access instruction from an access management system, where the service access instruction is forwarded by the access management system to the login computer system when verifying that the service access instruction does not include a trusted identifier or the trusted identifier is illegal; and the determining, according to the verification notification, whether to access the service system according to the service access instruction includes: if the verification notification is a verification success notification, generating a trusted identifier corresponding to the to-be-verified terminal device and the to-be-verified user, and adding the trusted identifier to the service access instruction, for the access management system to access the service system according to the service access instruction to which the trusted identifier is added; or if the verification notification is a verification failure notification, performing authentication on the to-be-verified user, and determining, according to the performed authentication, whether to generate a trusted identifier corresponding to the to-be-verified terminal device and the to-be-verified user.

In some embodiments, when the computer executable instruction is executed, the method further includes: receiving security information related to the to-be-verified terminal device; and sending the security information related to the to-be-verified terminal device to the risk calculation engine system, for the risk calculation engine system to verify a security risk of the to-be-verified terminal device according to the security information related to the to-be-verified terminal device after verifying that the to-be-verified terminal device is a specified device of the to-be-verified user.

The device for accessing the service system in this embodiment of the specification sends, to the risk calculation engine system, the fingerprint information of the to-be-verified terminal device and the identification information of the to-be-verified user that are received based on the service access instruction, and determines, according to the verification notification from the risk calculation engine system according to the identification information of the to-be-verified user and the fingerprint information of the to-be-verified terminal device and that is used for indicating whether the to-be-verified terminal device is a specified device of the to-be-verified user, whether to access the service system according to the service access instruction, that is, needs to determine, according to a result of the verifying indicating whether the to-be-verified terminal device is a specified device of the to-be-verified user, whether to access the service system. Therefore, a network attack caused by loss or phishing of an account of the to-be-verified user can be intercepted, thereby effectively defending against the network attack.

Corresponding to the service system access method, based on a same technical idea, an embodiment of the specification further provides a storage medium, configured to store a computer executable instruction.

In a specific embodiment, the storage medium is applied to a risk calculation engine system, the storage medium may be a USB flash drive, an optical disc, a hard disk, or the like, and when executed by a processor, the computer executable instruction stored in the storage medium can implement the following procedure: receiving fingerprint information of a to-be-verified terminal device and identification information of a to-be-verified user from a login computer system based on a service access instruction, where the service access instruction is initiated by the to-be-verified user to access a service system using the to-be-verified terminal device; verifying whether the to-be-verified terminal device is a specified device of the to-be-verified user based on a specified device database according to the fingerprint information of the to-be-verified terminal device and the identification information of the to-be-verified user, where the specified device database includes identification information of each user and fingerprint information of a specified device of each user; and determining, according to a result of the verifying, whether to allow the login computer system to access the service system according to the service access instruction.

In some embodiments, when the computer executable instruction stored in the storage medium is executed by the processor, the following is further included: receiving security information related to the to-be-verified terminal device from the login computer system; and the determining, according to a result of the verifying, whether to allow the login computer system to access the service system according to the service access instruction includes: if the to-be-verified terminal device is a specified device of the to-be-verified user, performing security risk verification on the to-be-verified terminal device according to the security information related to the to-be-verified terminal device; and determining, according to a result of security risk verification, whether to allow the login computer system to access the service system according to the service access instruction.

In some embodiments, when the computer executable instruction stored in the storage medium is executed by the processor, the service access instruction is initiated by the to-be-verified user to the login computer system to access the service system using the to-be-verified terminal device; and the determining, according to a result of the verifying, whether to allow the login computer system to access the service system according to the service access instruction includes:
if the to-be-verified terminal device is a specified device of the to-be-verified user, sending a verification success notification to the login computer system, for the login computer system to access the service system according to the service access instruction in response to the verification success notification; or if the to-be-verified terminal device is not a specified device of the to-be-verified user, sending a verification failure notification to the login computer system, for the login computer system to perform authentication on the to-be-verified user in response to the verification failure notification and determine, according to the performed authentication, whether to access the service system according to the service access instruction.

In some embodiments, when the computer executable instruction stored in the storage medium is executed by the processor, the service access instruction is initiated by the to-be-verified user to the service system to access the service system using the to-be-verified terminal device; and the service access instruction is forwarded by an access management system to the login computer system when verifying that the service access instruction does not include a trusted identifier or the trusted identifier is illegal.

In some embodiments, when the computer executable instruction stored in the storage medium is executed by the processor, the determining, according to a result of the verifying, whether to allow the login computer system to access the service system according to the service access instruction includes: if the to-be-verified terminal device is a specified device of the to-be-verified user, sending a verification success notification to the login computer system, for the login computer system to generate a trusted identifier corresponding to the to-be-verified terminal device and the to-be-verified user in response to the verification success notification, and for the access management system to access the service system according to the service access instruction to which the trusted identifier is added; or if the to-be-verified terminal device is not a specified device of the to-be-verified user, sending a verification failure notification to the login computer system, for the login computer system to perform authentication on the to-be-verified user in response to the verification failure notification and determine, according to the performed authentication, whether to generate a trusted identifier corresponding to the to-be-verified terminal device and the to-be-verified user.

When the computer executable instruction stored in the storage medium in this embodiment of the present application is executed by the processor, whether the to-be-verified terminal device is a specified device of the to-be-verified user is verified based on the specified device database according to the fingerprint information of the to-be-verified terminal device and the identification information of the to-be-verified user; whether to allow the login computer system to access the service system according to the service access instruction is determined according to the result of the verifying, that is, during access to the service system, whether the to-be-verified terminal device used by the to-be-verified user to initiate the service access instruction is a specified device of the to-be-verified user is verified; and whether to perform access is determined according to the result of the verifying. Therefore, a network attack caused by loss or phishing of an account of the to-be-verified user can be intercepted, thereby effectively defending against the network attack. In addition, the verification step is simple and easy to perform, and therefore, verification efficiency is relatively high.

In a specific embodiment, the storage medium is applied to a login computer system, the storage medium may be a USB flash drive, an optical disc, a hard disk, or the like, and when executed by a processor, the computer executable instruction stored in the storage medium can implement the following procedure: receiving a service access instruction, and receiving fingerprint information of a to-be-verified terminal device and identification information of a to-be-verified user based on the service access instruction, where the service access instruction is initiated by the to-be-verified user to access a service system using the to-be-verified terminal device; sending the fingerprint information of the to-be-verified terminal device and the identification information of the to-be-verified user to a risk calculation engine system, for the risk calculation engine system to verify whether the to-be-verified terminal device is a specified device of the to-be-verified user; and receiving a verification notification from the risk calculation engine system, and determining, according to the verification notification, whether to access the service system according to the service access instruction.

In some embodiments, when the computer executable instruction stored in the storage medium is executed by the processor, the receiving a service access instruction includes: receiving the service access instruction from the to-be-verified user using the to-be-verified terminal device; and the determining, according to the verification notification, whether to access the service system according to the service access instruction includes: if the verification notification is a verification success notification, accessing the service system according to the service access instruction; or if the verification notification is a verification failure notification, performing authentication on the to-be-verified user, and determining, according to the performed authentication, whether to access the service system according to the service access instruction.

In some embodiments, when the computer executable instruction stored in the storage medium is executed by the processor, the receiving a service access instruction includes: receiving a service access instruction from an access management system, where the service access instruction is forwarded by the access management system to the login computer system when verifying that the service access instruction does not include a trusted identifier or the trusted identifier is illegal; and the determining, according to the verification notification, whether to access the service system according to the service access instruction includes: if the verification notification is a verification success notification, generating a trusted identifier corresponding to the to-be-verified terminal device and the to-be-verified user, and adding the trusted identifier to the service access instruction, for the access management system to access the service system according to the service access instruction to which the trusted identifier is added; or if the verification notification is a verification failure notification, performing authentication on the to-be-verified user, and determining, according to the performed authentication, whether to generate a trusted identifier corresponding to the to-be-verified terminal device and the to-be-verified user.

In some embodiments, when the computer executable instruction stored in the storage medium is executed by the processor, the following is further included: receiving security information related to the to-be-verified terminal device; and sending the security information related to the to-be-verified terminal device to the risk calculation engine system, for the risk calculation engine system to verify a security risk of the to-be-verified terminal device according to the security information related to the to-be-verified terminal device after verifying that the to-be-verified terminal device is a specified device of the to-be-verified user.

When the computer executable instruction stored in the storage medium in this embodiment of the present application is executed by the processor, the fingerprint information of the to-be-verified terminal device and the identification information of the to-be-verified user that are obtained based on the service access instruction are sent to the risk calculation engine system, and whether to access the service system according to the service access instruction is determined according to the verification notification from the risk calculation engine system according to the identification information of the to-be-verified user and the fingerprint information of the to-be-verified terminal device and that is used for indicating whether the to-be-verified terminal device is a specified device of the to-be-verified user, that is, whether to access the service system needs to be determined according to a result of the verifying indicating whether the to-be-verified terminal device is a specified device of the to-be-verified user. Therefore, a network attack caused by loss or phishing of an account of the to-be-verified user can be intercepted, thereby effectively defending against the network attack.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this application, the function of the units may be implemented in a same piece of or multiple pieces of software and/or hardware.

A person skilled in the art should understand that the embodiments of this application may be provided as a method, a system, or a computer program product. Therefore, this application may use a form of a hardware-only embodiment, a software-only embodiment, or an embodiment combining software and hardware. In addition, this application may use a form of a computer program product implemented on one or more computer available storage media (including but not limited to a disk memory, a CD-ROM, an optical memory, and the like) including computer available program code.

This application is described with reference to flowcharts and/or block diagrams of the method, the device (system), and the computer program product in the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer available storage media (including but not limited to a disk memory, a CD-ROM, an optical memory, and the like) including computer available program code.

This application can be described in the general context of computer executable instructions executed by a computer, for example, a program module. Generally, the program module includes a routine, a program, an object, a component, a data structure, and the like for executing a particular task or implementing a particular abstract data type. This application can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A method for accessing a service server, comprising:
    receiving a service access instruction to access the service server from a login computer system, the service access instruction comprising fingerprint information of a to-be-verified terminal device, identification information of a to-be-verified user, and a first trusted identifier previously generated by the login computer system according to data of the to-be-verified terminal device and the identification information of the to-be-verified user in combination with a preset calculation rule, wherein the first trusted identifier indicates that the to-be-verified terminal device and the to-be-verified user are trusted, and the service access instruction is initiated by the to-be-verified user using the to-be-verified terminal device;
    parsing the service access instruction to obtain the fingerprint information of the to-be-verified terminal device, the identification information of the to-be-verified user, and the trusted identifier;
    calculating, according to the preset calculation rule, a second trusted identifier corresponding to the to-be-verified terminal device and the to-be-verified user using the fingerprint information of the to-be-verified terminal device and the identification information of the to-be-verified user received in the service access instruction;
    determining whether the first trusted identifier matches the second trusted identifier;
    determining the login computer system is allowed to access the service server according to the service access instruction responsive to determining the first trusted identifier matches the second trusted identifier; and
    in response to determining that the login computer system is allowed to access the service server, sending a notification to the login computer system to enable the login computer system to access the service server.

2. The method according to claim 1, wherein the method further comprises: forwarding the service access instruction by an access management server to the login computer system responsive to determining the first trusted identifier does not match the second trusted identifier.

3. The method according to claim 2, wherein the method further comprises:
    determining whether the to-be-verified terminal device is a specified device of the to-be-verified user; and
    sending a verification success notification to the login computer system, to enable the login computer system to generate a third trusted identifier corresponding to the to-be-verified terminal device and the to-be-verified user responsive to determining the to-be-verified terminal device is a specified device of the to-be-verified user, wherein the access management server is configured to access the service server according to the service access instruction with the generated third trusted identifier.

4. The method according to claim 3, wherein the method further comprises:
    sending a verification failure notification to the login computer system, to perform authentication on the to-be-verified user, responsive to determining the to-be-verified terminal device is a specified device of the to-be-verified user; and
    determining, according to the performed authentication on the to-be-verified user, whether to generate the further trusted identifier corresponding to the to-be-verified terminal device and the to-be-verified user.

5. A device for accessing a service server, comprising:
    a processor; and
    a memory configured to store computer executable instructions executable by the processor to cause the processor to perform operations comprising:
    receiving a service access instruction to access the service server from a login computer system, the service access instruction comprising fingerprint information of a to-be-verified terminal device, identification information of a to-be-verified user, and a first trusted identifier previously generated by the login computer system according to data of the to-be-verified terminal device and the identification information of the to-be-verified user in combination with a preset calculation rule, wherein the first trusted identifier indicates that the to-be-verified terminal device and the to-be-verified user are trusted, and the service access instruction is initiated by the to-be-verified user using the to-be-verified terminal device;
    parsing the service access instruction to obtain the fingerprint information of the to-be-verified terminal device, the identification information of the to-be-verified user, and the trusted identifier;
    calculating, according to the preset calculation rule, a second trusted identifier corresponding to the to-be-verified terminal device and the to-be-verified user using the fingerprint information of the to-be-verified terminal device and the identification information of the to-be-verified user received in the service access instruction;
    determining whether the first trusted identifier matches the second trusted identifier;
    determining the login computer system is allowed to access the service server according to the service access instruction responsive to determining the first trusted identifier matches the second trusted identifier; and
    in response to determining that the login computer system is allowed to access the service server, sending a notification to the login computer system to enable the login computer system to access the service server.

6. The device according to claim 5, wherein the operations further comprise:
    forwarding the service access instruction by an access management server to the login computer system responsive to determining the first trusted identifier does not match the second trusted identifier.

7. The device according to claim 6, wherein the operations further comprise:
    determining whether the to-be-verified terminal device is a specified device of the to-be-verified user; and
    sending a verification success notification to the login computer system, to enable the login computer system to generate a third trusted identifier corresponding to the to-be-verified terminal device and the to-be-verified user responsive to determining the to-be-verified terminal device is a specified device of the to-be-verified user, wherein the access management server is configured to access the service server according to the service access instruction with the generated third trusted identifier.

8. A non-transitory computer-readable storage medium configured with instructions executable by one or more processors to cause the one or more processors to perform operations comprising:

receiving a service access instruction to access a service server from a login computer system, the service access instruction comprising fingerprint information of a to-be-verified terminal device, identification information of a to-be-verified user, and a first trusted identifier previously generated by the login computer system according to data of the to-be-verified terminal device and the identification information of the to-be-verified user in combination with a preset calculation rule, wherein the first trusted identifier indicates that the to-be-verified terminal device and the to-be-verified user are trusted, and the service access instruction is initiated by the to-be-verified user using the to-be-verified terminal device;

parsing the service access instruction to obtain the fingerprint information of the to-be-verified terminal device, the identification information of the to-be-verified user, and the trusted identifier;

calculating, according to the preset calculation rule, a second trusted identifier corresponding to the to-be-verified terminal device and the to-be-verified user using the fingerprint information of the to-be-verified terminal device and the identification information of the to-be-verified user received in the service access instruction;

determining whether the first trusted identifier matches the second trusted identifier;

determining the login computer system is allowed to access the service server according to the service access instruction responsive to determining the first trusted identifier matches the second trusted identifier; and in response to determining that the login computer system is allowed to access the service server, sending a notification to the login computer system to enable the login computer system to access the service server.

9. The non-transitory computer-readable storage medium according to claim 8, wherein the operations further comprise:

forwarding the service access instruction by an access management server to the login computer system responsive to determining the first trusted identifier does not match the second trusted identifier.

10. The non-transitory computer-readable storage medium according to claim 9, wherein the operations further comprise:

sending a verification success notification to the login computer system, to enable the login computer system to generate a third trusted identifier corresponding to the to-be-verified terminal device and the to-be-verified user responsive to determining the to-be-verified terminal device is a specified device of the to-be-verified user, wherein the access management server is configured to access the service server according to the service access instruction with the generated third trusted identifier.

11. The non-transitory computer-readable storage medium according to claim 8, wherein the operations further comprise:

sending a verification failure notification to the login computer system, to perform authentication on the to-be-verified user, responsive to determining the to-be-verified terminal device is a specified device of the to-be-verified user; and determining, according to the performed authentication on the to-be-verified user, whether to generate a third trusted identifier corresponding to the to-be-verified terminal device and the to-be-verified user.

12. The device according to claim 7, wherein the operations further comprise:

sending a verification failure notification to the login computer system, to perform authentication on the to-be-verified user, responsive to determining the to-be-verified terminal device is a specified device of the to-be-verified user; and determining, according to the performed authentication on the to-be-verified user, whether to generate the third trusted identifier corresponding to the to-be-verified terminal device and the to-be-verified user.

* * * * *